US012502051B2

(12) United States Patent
Gurevich et al.

(10) Patent No.: US 12,502,051 B2
(45) Date of Patent: Dec. 23, 2025

(54) METHODS AND SYSTEMS FOR GENERATING SIMULATED INTRAOPERATIVE IMAGING DATA OF A SUBJECT

(71) Applicant: Stryker Corporation, Kalamazoo, MI (US)

(72) Inventors: Lina Gurevich, Vancouver (CA); Benjamin Harder, Nashville, TN (US)

(73) Assignee: Stryker Corporation, Portage, MI (US)

( * ) Notice: Subject to any disclaimer, the term of this patent is extended or adjusted under 35 U.S.C. 154(b) by 451 days.

(21) Appl. No.: 17/932,670

(22) Filed: Sep. 15, 2022

(65) Prior Publication Data

US 2023/0081866 A1  Mar. 16, 2023

Related U.S. Application Data

(60) Provisional application No. 63/245,080, filed on Sep. 16, 2021.

(51) Int. Cl.
*A61B 1/00* (2006.01)
*A61B 1/04* (2006.01)
(Continued)

(52) U.S. Cl.
CPC .. *A61B 1/000096* (2022.02); *A61B 1/000094* (2022.02); *A61B 1/0005* (2013.01);
(Continued)

(58) Field of Classification Search
CPC ..... A61B 5/0059; A61B 5/0071; A61B 1/043; A61B 1/000096; G06T 5/60; G06V 10/774
See application file for complete search history.

(56) References Cited

U.S. PATENT DOCUMENTS

2021/0007687 A1   1/2021  Gurevich et al.
2022/0084201 A1*  3/2022  Dai ................ G06N 3/045
(Continued)

FOREIGN PATENT DOCUMENTS

WO   2020/017213 A1   1/2020
WO   2021/125056 A1   6/2021

OTHER PUBLICATIONS

Zhang et al. Improved generative adversarial networks using the total gradient loss for the resolution enhancement of fluorescence images. Biomed Opt Express. Aug. 22, 2019;10(9):4742-4756. doi: 10.1364/BOE.10.004742. (Year: 2019).*
(Continued)

*Primary Examiner* — Anh Tuan T Nguyen
*Assistant Examiner* — Younhee Choi
(74) *Attorney, Agent, or Firm* — Morrison & Foerster LLP

(57) ABSTRACT

The present disclosure relates generally to medical imaging, and more specifically to machine-learning techniques to generate intraoperative fluorescence images of a subject (e.g., to aid a surgery, to aid diagnosis and treatment of diseases). The system can receive an intraoperative white light image of the subject, input the intraoperative white light image of the subject into a generator of a trained generative adversarial network (GAN) model trained. In some examples, the GAN model is trained using a plurality of training image pairs, and each training image pair comprises an intraoperative white light training image and an intraoperative fluorescence training image of a same tissue. The system can obtain, from the generator, the generated intraoperative fluorescence image of the subject and display, on a display, the generated intraoperative fluorescence image of the subject.

35 Claims, 19 Drawing Sheets
(9 of 19 Drawing Sheet(s) Filed in Color)

(51) Int. Cl.
  *G06T 5/40* (2006.01)
  *G06T 5/73* (2024.01)
  *G06T 7/00* (2017.01)
  *G06T 11/00* (2006.01)

(52) U.S. Cl.
  CPC .............. *A61B 1/043* (2013.01); *G06T 5/40* (2013.01); *G06T 5/73* (2024.01); *G06T 7/0014* (2013.01); *G06T 11/00* (2013.01); *G06T 2200/24* (2013.01); *G06T 2207/10064* (2013.01); *G06T 2207/10068* (2013.01); *G06T 2207/20081* (2013.01); *G06T 2207/20084* (2013.01); *G06T 2207/30096* (2013.01)

(56) References Cited

U.S. PATENT DOCUMENTS

2022/0138945 A1* 5/2022 Luengo Hendriks .. G06V 20/70 382/133
2023/0266221 A1* 8/2023 Johnson ............. G01N 15/1433 382/133
2023/0341329 A1* 10/2023 Johnson ............. G01N 21/6458

OTHER PUBLICATIONS

Ounkomol et al. Label-free prediction of three-dimensional fluorescence images from transmitted-light microscopy. Nat Methods. Nov. 2018; 15(11):917-920. doi: 10.1038/s41592-018-0111-2. (Year: 2018).*

International Preliminary Report on Patentability mailed Mar. 28, 2024, directed to International Application No. PCT/US2022076473; 9 pages.

International Search Report and Written Opinion mailed Jan. 10, 2023, directed to International Application No. PCT/US2022/076473; 12 pages.

* cited by examiner

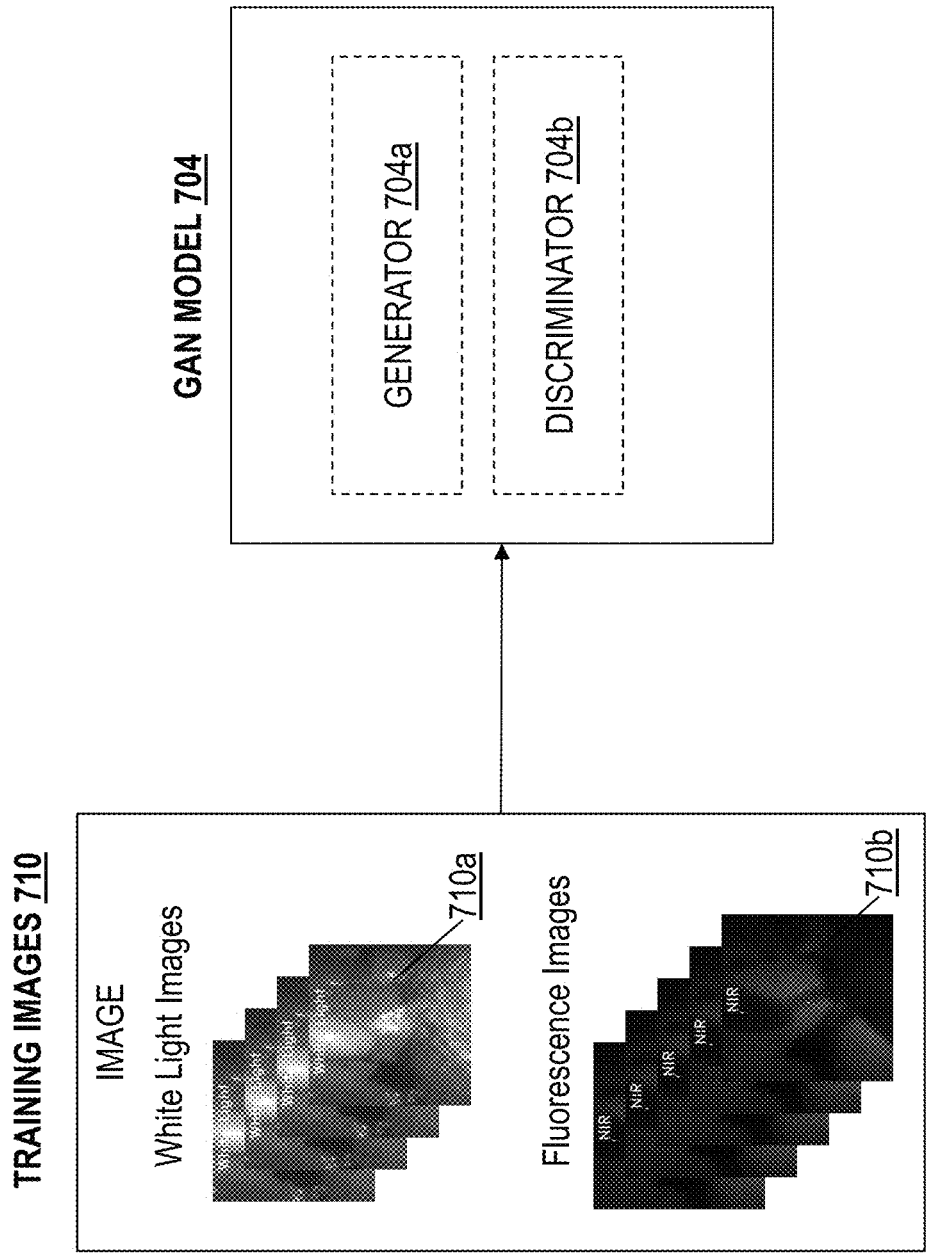

White light image 1102

Simulated blue light image 1104

White light image with tumor outline overlay 1106

1200

1202
Receiving an intraoperative white light image of a subject

1204
Generating a semantic segmentation mask outlining at least one tumor in the intraoperative white light image, the semantic segmentation mask generated by a machine learning model trained using a plurality of training image pairs, wherein each training image pair comprises an intraoperative white light training image and an intraoperative fluorescence training image of a same tissue

1206
Extracting an outline of the tumor from the mask

1208
Generating the simulated fluorescence image, wherein an area inside the outline in the simulated fluorescence image is represented by a first color and an area outside the outline in the simulated fluorescence image is represented by a second color

1210
Displaying a visualization of the tumor, wherein the visualization comprises a combination of the white light image and the simulated fluorescence image

FIG. 12

METHODS AND SYSTEMS FOR GENERATING SIMULATED INTRAOPERATIVE IMAGING DATA OF A SUBJECT

CROSS-REFERENCE TO RELATED APPLICATIONS

This application claims the benefit of U.S. Provisional Application No. 63/245,080, filed Sep. 16, 2021, the entire contents of which are hereby incorporated by reference herein.

FIELD

The present disclosure relates generally to medical imaging, and more specifically to machine-learning techniques to generate simulated intraoperative fluorescence images of a subject (e.g., to aid a surgery, to aid diagnosis and treatment of diseases).

BACKGROUND

Medical systems, instruments or tools are utilized pre-surgery, during surgery, or post-operatively for various purposes. Some of these medical tools may be used in what are generally termed endoscopic procedures or open field procedures. For example, endoscopy in the medical field allows internal features of the body of a patient to be viewed without the use of traditional, fully invasive surgery. Endoscopic imaging systems incorporate endoscopes to enable a surgeon to view a surgical site, and endoscopic tools enable minimally invasive surgery at the site. Such tools may be shaver-type devices which mechanically cut bone and hard tissue, or radio frequency (RF) probes which are used to remove tissue via ablation or to coagulate tissue to minimize bleeding at the surgical site, for example.

In endoscopic surgery, the endoscope is placed in the body at the location at which it is necessary to perform a surgical procedure. Other surgical instruments, such as the endoscopic tools mentioned above, are also placed in the body at the surgical site. A surgeon views the surgical site through the endoscope in order to manipulate the tools to perform the desired surgical procedure. Some endoscopes are usable along with a camera head for the purpose of processing the images received by the endoscope. An endoscopic camera system typically includes a camera head connected to a camera control unit (CCU) by a cable. The CCU processes input image data received from the image sensor of the camera via the cable and then outputs the image data for display. The resolution and frame rates of endoscopic camera systems are ever increasing and each component of the system must be designed accordingly.

Another type of medical imager that can include a camera head connected to a CCU by a cable is an open-field imager. Open-field imagers can be used to image open surgical fields, such as for visualizing blood flow in vessels and related tissue perfusion during plastic, microsurgical, reconstructive, and gastrointestinal procedures.

While imaging agents can be used to visualize important anatomical structures to improve the outcome of a surgery, intraoperative imaging (e.g., fluorescence imaging) is often not utilized by surgeons in practice. In fact, fluorescence imaging is only used in around 45% of surgical cases. This is because it may be inconvenient or impractical to administer the imaging agent and wait until the imaging agent reaches the relevant anatomical structures before commencing the surgery. Thus, it is desirable to develop techniques for imaging of a subject without requiring administration of an imaging agent to the subject.

SUMMARY

Disclosed herein are exemplary devices, apparatuses, systems, methods, and non-transitory storage media for imaging of a subject. The systems, devices, and methods may be used for imaging tissue of a subject, such as in endoscopic imaging procedures or open field surgical imaging procedures. Imaging may be performed pre-operatively, intra-operatively, post-operatively, and during diagnostic imaging sessions and procedures. The imaging methods may exclude insertion of an endoscopic imager into a lumen in the body or the use of an open field imaging system. The endoscopic imager may be pre-inserted into a lumen in the body. The imaging methods may exclude an invasive surgical step.

An exemplary system can receive an intraoperative white light image of the subject, input the intraoperative white light image of the subject into a generator component of a trained generative adversarial network (GAN) model. The generator component can comprise a neural network architecture. The GAN model has been trained using a plurality of paired or unpaired training images. In some examples, the GAN model is trained using a plurality of training image pairs, and each training image pair comprises an intraoperative white light training image and an intraoperative fluorescence training image of a same tissue. The GAN model can be trained to generate an intraoperative fluorescence image based on an inputted intraoperative white light image. The system can obtain, from the generator, the generated intraoperative fluorescence image of the subject and display, on a display, the generated intraoperative fluorescence image of the subject.

Thus, instead of administering an imaging agent to the patient to obtain fluorescence images, the system can simply generate simulated fluorescence images from the white light images using the techniques described herein. The GAN model can improve surgical efficiency and lead to better patient outcomes. In some examples, the intraoperative white light image of the subject is captured during a surgical operation, and the system can provide a recommendation related to the surgical operation based on the generated intraoperative fluorescence image. The recommendation can be related to navigating a surgical instrument. The recommendation can be an indication of an anatomical structure to operate on or to avoid. The recommendation can be related to administration of a particular treatment. The recommendation can be related to identification of a high-risk area or a potential complication. In some examples, the recommendation is provided during the surgery such that the surgeon can alter the course of action in real time.

In some examples, the generated image can be provided (e.g., displayed) to a medical practitioner, who can review the image to identify, recommend, and/or administer a treatment to the patient pre-surgery, during surgery, or post-operatively. In some examples, the generated image can be provided to a computer-based system, which processes the image to identify, recommend, and/or administer a treatment to the patient. For example, the system can provide the generated image to a classification model to automatically identify one or more complications. Based on the identified issue, a treatment can be automatically recommended (e.g., via one or more graphical user interfaces). The treatment can also be automatically administered, for example, by a medical device (e.g., a surgical robot) based on the automatically recommended treatment.

In some examples, the system identifies an anatomical structure in the generated intraoperative fluorescence image and labels the intraoperative white light image based on the identification. For example, the system can identify an anatomical structure of interest in a fluorescence image because the anatomical structure appears more pronounced in the fluorescence image. After the anatomical structure is identified, the system can automatically label the identified anatomical structure in the corresponding white light image. The labelled white light image can be then used for downstream tasks, such as training a machine-learning model. Collecting, labeling, and storing a large volume of training images manually can require a large amount of time of skilled reviewers and can be error-prone because bias can be introduced by the reviewers. Thus, the techniques of automatically labelling images can lead to more efficient and accurate generation of image data (e.g., for training machine-learning models), thus improving functioning of a computer system.

An exemplary method of imaging of a subject comprises: receiving an intraoperative white light image of the subject; inputting the intraoperative white light image of the subject into a generator of a trained generative adversarial network (GAN) model trained using a plurality of training image pairs, wherein each training image pair comprises an intraoperative white light training image and an intraoperative fluorescence training image of a same tissue to generate an intraoperative fluorescence image based on the inputted intraoperative white light image; obtaining, from the generator, a generated intraoperative fluorescence image of the subject; and displaying, on a display, the generated intraoperative fluorescence image of the subject.

According to some aspects, the method comprises simultaneously displaying the generated intraoperative fluorescence image and the intraoperative white light image on the display.

According to some aspects, the method further comprises displaying the generated intraoperative fluorescence image as an overlay on the intraoperative white light image.

According to some aspects, the intraoperative white light image of the subject is captured during a surgical operation, the method further comprising: providing a recommendation related to the surgical operation based on the generated intraoperative fluorescence image.

According to some aspects, the recommendation is related to navigating a surgical instrument.

According to some aspects, the recommendation is related to an indication of an anatomical structure to operate on or to avoid.

According to some aspects, the method further comprises: identifying an anatomical structure in the generated intraoperative fluorescence image; and labeling the intraoperative white light image based on the identification.

According to some aspects, the method further comprises training a machine-learning model using the labeled intraoperative white light image.

According to some aspects, the trained GAN model comprises a discriminator and the generator.

According to some aspects, the discriminator is a Patch-GAN model.

According to some aspects, the generator is a modified U-Net model.

According to some aspects, the trained GAN model is a trained Pix2Pix model.

According to some aspects, the trained GAN model is trained by: inputting an intraoperative white light training image of a particular training image pair into the generator to obtain a simulated image; comparing the simulated image with an intraoperative fluorescence training image of the particular training image pair to obtain a generator loss; inputting the simulated image into the discriminator to obtain a discriminator loss; updating the discriminator based on the discriminator loss; and updating the generator based on the discriminator loss and the generator loss.

According to some aspects, the plurality of training image pairs is selected at least partially by: obtaining intraoperative white light image data and intraoperative fluorescence data of a same procedure; selecting one or more images from the intraoperative white light data and one or more images from the intraoperative fluorescence data to include in the plurality of training image pairs.

According to some aspects, the intraoperative white light image data comprises an intraoperative white light video.

According to some aspects, the intraoperative fluorescence image data comprises an intraoperative fluorescence video.

According to some aspects, the intraoperative fluorescence image data comprises an intraoperative near-infrared ("NIR") video.

According to some aspects, the one or more images in the intraoperative fluorescence image data are selected based on contrast information of the one or more images.

According to some aspects, the one or more images in the intraoperative fluorescence image data are selected based on a determination that the one or more images do not include an artifact.

According to some aspects, the one or more images in the intraoperative fluorescence image data are selected based on a determination of whether the one or more images include an object.

According to some aspects, the object is a surgical instrument.

According to some aspects, the one or more images in the intraoperative fluorescence image data are selected based on an event.

According to some aspects, the event is an insertion of a surgical instrument.

According to some aspects, the intraoperative white light image data and the intraoperative fluorescence image data depict an anatomical structure.

According to some aspects, the anatomical structure is a bile duct, a lymph node, a gallbladder, a cystic duct, a liver, a mass of adipose tissue, or a ureter.

According to some aspects, the intraoperative white light image data and the intraoperative fluorescence image data depict a cancer tumor.

According to some aspects, the intraoperative fluorescence image data corresponds to an imaging agent.

According to some aspects, the imaging agent is indocyanine green (ICG) or methylene blue.

According to some aspects, displaying the generated intraoperative fluorescence image of the subject comprises: displaying the intraoperative fluorescence image after an image filter is applied.

According to some aspects, the image filter comprises: a histogram equalization filter, a de-noising filter, or a de-blurring filter.

According to some aspects, the generated intraoperative fluorescence image is a generated intraoperative blue light image and the intraoperative fluorescence training image is an intraoperative blue light training image.

According to some aspects, the method further comprises simultaneously displaying the generated intraoperative blue light image and the intraoperative white light image on the display.

According to some aspects, the method further comprises: identifying a tumor in the generated intraoperative blue light image; extracting an outline of the tumor in the generated intraoperative blue light image; and displaying the outline of the tumor as an overlay on the intraoperative white light image.

According to some aspects, the trained GAN model comprises a discriminator and the generator.

According to some aspects, the trained GAN model is a trained RegGAN model.

According to some aspects, the trained GAN model is a trained CycleGAN, UNIT, MUNIT, or NICEGAN model.

According to some aspects, the trained GAN model is a trained Pix2Pix model.

According to some aspects, the trained GAN model is trained by: inputting an intraoperative white light training image of a particular training image pair into the generator to obtain a simulated image; comparing the simulated image with an intraoperative blue light training image of the particular training image pair to obtain a generator loss; inputting the simulated image into the discriminator to obtain a discriminator loss; updating the discriminator based on the discriminator loss; and updating the generator based on the discriminator loss and the generator loss.

According to some aspects, the trained GAN model is further trained by: inputting the simulated image into a registration module to obtain a correction loss; updating the registration module based on the correction loss; and updating the generator based on the correction loss.

An exemplary system for generating an intraoperative fluorescence image of a subject comprises: one or more processors; one or more memories; and one or more programs, wherein the one or more programs are stored in the one or more memories and configured to be executed by the one or more processors, the one or more programs including instructions for: receiving an intraoperative white light image of the subject; inputting the intraoperative white light image of the subject into a generator of a trained generative adversarial network (GAN) model trained using a plurality of training image pairs, wherein each training image pair comprises an intraoperative white light training image and an intraoperative fluorescence training image of a same tissue, to generate an intraoperative fluorescence image based on the inputted intraoperative white light image; obtaining, from the generator, a generated intraoperative fluorescence image of the subject; and displaying, on a display, the generated intraoperative fluorescence image of the subject.

According to some aspects, the one or more programs further include instructions for: simultaneously displaying the generated intraoperative fluorescence image and the intraoperative white light image on the display.

According to some aspects, the one or more programs further include instructions for: displaying the generated intraoperative fluorescence image as an overlay on the intraoperative white light image.

According to some aspects, the intraoperative white light image of the subject is captured during a surgical operation, and wherein the one or more programs further include instructions for: providing a recommendation related to the surgical operation based on the simulated intraoperative fluorescence image.

According to some aspects, the recommendation is related to navigating a surgical instrument.

According to some aspects, the recommendation is related to an indication of an anatomical structure to operate on or to avoid.

According to some aspects, the one or more programs further include instructions for: identifying an anatomical structure in the generated intraoperative fluorescence image; and labeling the intraoperative white light image based on the identification.

According to some aspects, the one or more programs further include instructions for: training a machine-learning model using the labeled intraoperative white light image.

According to some aspects, the trained GAN model comprises a discriminator and the generator.

According to some aspects, the discriminator is a Patch-GAN model.

According to some aspects, the generator is a modified U-Net model.

According to some aspects, the trained GAN model is a trained Pix2Pix model.

According to some aspects, the trained GAN model is trained by: inputting an intraoperative white light training image of a particular training image pair into the generator to obtain a simulated image; comparing the simulated image with an intraoperative fluorescence training image of the particular training image pair to obtain a generator loss; inputting the simulated image into the discriminator to obtain a discriminator loss; updating the discriminator based on the discriminator loss; and updating the generator based on the discriminator loss and the generator loss.

According to some aspects, the plurality of training image pairs is selected at least partially by: obtaining intraoperative white light image data and intraoperative fluorescence data of a same procedure; selecting one or more images from the intraoperative white light data and one or more images from the intraoperative fluorescence data to include in the plurality of training image pairs.

According to some aspects, the intraoperative white light image data comprises an intraoperative white light video.

According to some aspects, the intraoperative fluorescence image data comprises an intraoperative fluorescence video.

According to some aspects, the intraoperative fluorescence image data comprises an intraoperative near-infrared ("NIR") video.

According to some aspects, the one or more images in the intraoperative fluorescence image data are selected based on contrast information of the one or more images.

According to some aspects, the one or more images in the intraoperative fluorescence image data are selected based on a determination that the one or more images do not include an artifact.

According to some aspects, the one or more images in the intraoperative fluorescence image data are selected based on a determination of whether the one or more images include an object.

According to some aspects, the object is a surgical instrument.

According to some aspects, the one or more images in the intraoperative fluorescence image data are selected based on an event.

According to some aspects, the event is an insertion of a surgical instrument.

According to some aspects, the intraoperative white light image data and the intraoperative fluorescence image data depict an anatomical structure.

According to some aspects, the anatomical structure is a bile duct, a lymph node, a gallbladder, a cystic duct, a liver, a mass of adipose tissue, or a ureter.

According to some aspects, the intraoperative white light image data and the intraoperative fluorescence image data depict a cancer tumor.

According to some aspects, the intraoperative fluorescence image data corresponds to an imaging agent.

According to some aspects, the imaging agent is indocyanine green (ICG) or methylene blue.

According to some aspects, displaying the generated intraoperative fluorescence image of the subject comprises: displaying the intraoperative fluorescence image after an image filter is applied.

According to some aspects, the image filter comprises: a histogram equalization filter, a de-noising filter, or a de-blurring filter.

According to some aspects, the generated intraoperative fluorescence image is a generated intraoperative blue light image and the intraoperative fluorescence training image is an intraoperative blue light training image.

According to some aspects, the one or more programs further include instructions for: simultaneously displaying the generated intraoperative blue light image and the intraoperative white light image on the display.

According to some aspects, the one or more programs further include instructions for: identifying a tumor in the generated intraoperative blue light image; extracting an outline of the tumor in the generated intraoperative blue light image; and displaying the outline of the tumor as an overlay on the intraoperative white light image.

According to some aspects, the trained GAN model comprises a discriminator and the generator.

According to some aspects, the trained GAN model is a trained RegGAN model.

According to some aspects, the trained GAN model is a trained CycleGAN, UNIT, MUNIT, or NICEGAN model.

According to some aspects, the trained GAN model is a trained Pix2Pix model.

According to some aspects, the trained GAN model is trained by: inputting an intraoperative white light training image of a particular training image pair into the generator to obtain a simulated image; comparing the simulated image with an intraoperative blue light training image of the particular training pair to obtain a generator loss; inputting the simulated image into the discriminator to obtain a discriminator loss; updating the discriminator based on the discriminator loss; and updating the generator based on the discriminator loss and the generator loss.

According to some aspects, the one or more programs further include instructions for: inputting the simulated image into a registration module to obtain a correction loss; updating the registration module based on the correction loss; and updating the generator based on the correction loss.

An exemplary non-transitory computer-readable storage medium stores one or more programs, the one or more programs comprising instructions, which when executed by one or more processors of an electronic device, cause the electronic device to perform any of the techniques described herein.

An exemplary computer program product comprises one or more programs, the one or more programs comprising instructions, which when executed by one or more processors of an electronic device, cause the electronic device to perform any of the techniques described herein.

An exemplary method of generating an intraoperative fluorescence image of a subject comprises: receiving an intraoperative white light image of a subject, generating a semantic segmentation mask outlining at least one tumor in the intraoperative white light image, the semantic segmentation mask generated by a machine learning model trained using a plurality of training image pairs, wherein each training image pair comprises an intraoperative white light training image and an intraoperative fluorescence training image of a same tissue; extracting an outline of the tumor from the mask; and generating the generated fluorescence image, wherein an area inside the outline in the generated fluorescence image is represented by the first color and an area outside the outline in the generated fluorescence image is represented by a second color.

According to some aspects, the area inside the outline is a semi-transparent pink coloring; and the area outside the outline is a semi-transparent blue coloring.

According to some aspects, the method further comprises: displaying a visualization of the tumor, wherein the visualization comprises a combination of the white light image and the generated fluorescence image.

According to some aspects, the machine learning model is trained by: receiving a pair of training images, wherein the pair of training images comprises a white light training image of a subject and a fluorescence training image of a same subject; identifying a location of a tumor in the fluorescence training image; annotating the location of the tumor on the white light training image; and updating the machine learning model with the annotated white light image.

An exemplary system for generating an intraoperative fluorescence image of a subject comprises: one or more processors; one or more memories; and one or more programs, wherein the one or more programs are stored in the one or more memories and configured to be executed by the one or more processors, the one or more programs including instructions for: receiving an intraoperative white light image of a subject; generating a semantic segmentation mask outlining at least one tumor in the intraoperative white light image, the semantic segmentation mask generated by a machine learning model trained using a plurality of training image pairs, wherein each training image pair comprises an intraoperative white light training image and an intraoperative fluorescence training image of a same tissue; extracting an outline of the tumor from the mask; and generating the generated fluorescence image, wherein an area inside the outline in the generated fluorescence image is represented by a first color and an area outside the outline in the generated fluorescence image is represented by a second color.

According to some aspects, the area inside the outline is a semi-transparent pink coloring; and the area outside the outline is a semi-transparent blue coloring.

According to some aspects, the one or more programs further include instructions for: displaying a visualization of the tumor, wherein the visualization comprises a combination of the white light image and the generated fluorescence image.

According to some aspects, the machine learning model is trained by: receiving a pair of training images, wherein the pair of training images comprises a white light training image of a subject and a fluorescence training image of a same subject; identifying a location of a tumor in the fluorescence training image; annotating the location of the tumor on the white light training image; and updating the machine learning model with the annotated white light image.

An exemplary non-transitory computer-readable storage medium stores one or more programs, the one or more programs comprising instructions, which when executed by one or more processors of an electronic device, cause the electronic device to perform any of the techniques described herein.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention will now be described, by way of example only, with reference to the accompanying drawings, in which:

FIG. 7B illustrates an exemplary process for training a GAN model, according to some examples;

FIG. 12 illustrates an exemplary method for visualizing a tumor in an intraoperative white light image.

DETAILED DESCRIPTION

Figure 1A:
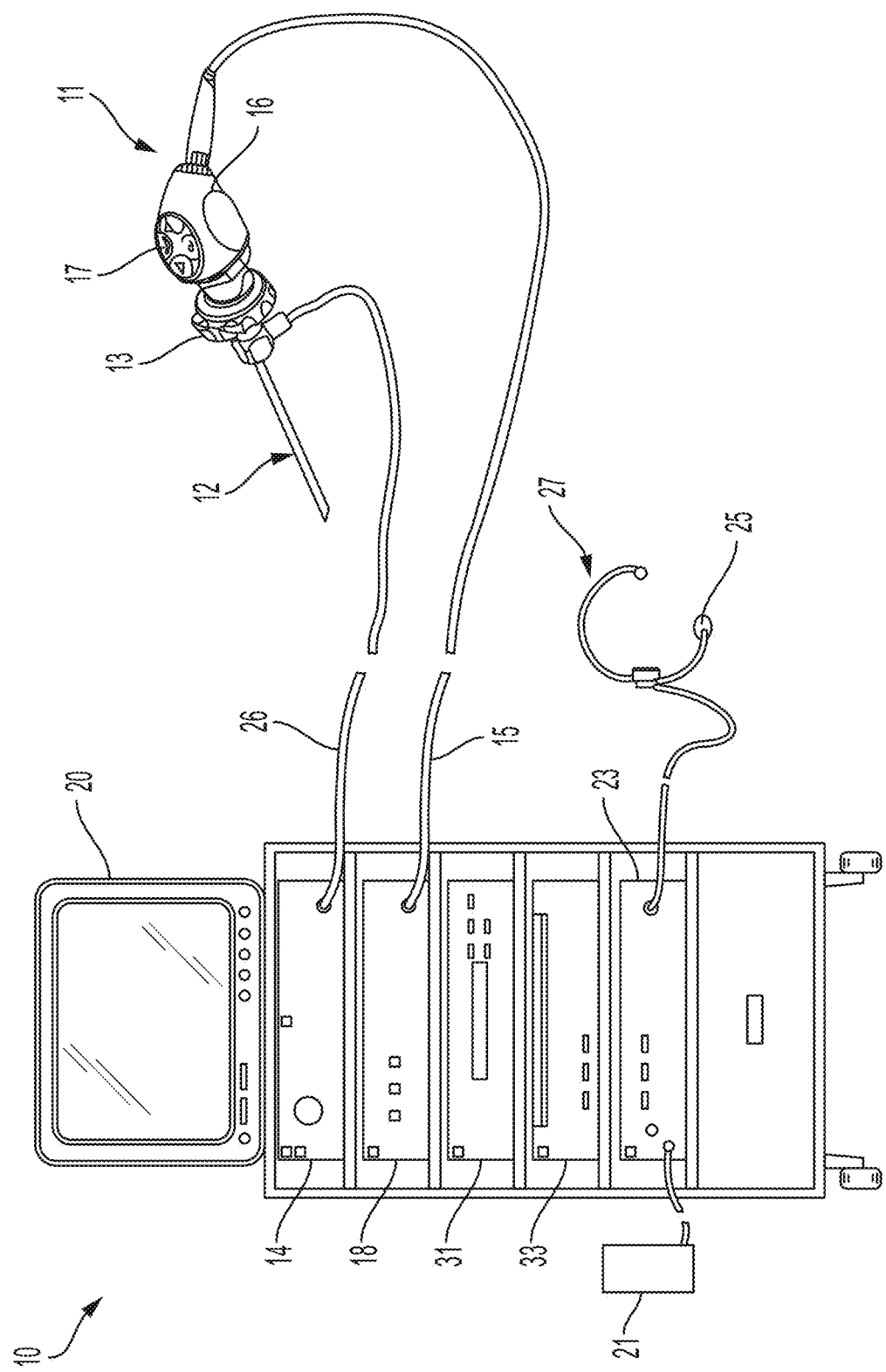
FIG. 1A is an illustration of an endoscopic camera system, according to some examples.

Reference will now be made in detail to implementations and various aspects and variations of systems and methods described herein. Although several exemplary variations of the systems and methods are described herein, other variations of the systems and methods may include aspects of the systems and methods described herein combined in any suitable manner having combinations of all or some of the aspects described. Examples will now be described more fully hereinafter with reference to the accompanying drawings; however, they may be embodied in different forms and should not be construed as limited to the examples set forth herein. Rather, these examples are provided so that this disclosure will be thorough and complete, and will fully convey exemplary implementations to those skilled in the art.

Disclosed herein are exemplary devices, apparatuses, systems, methods, and non-transitory storage media for imaging of a subject, and/or for generating an intraoperative fluorescence image of a subject. The systems, devices, and methods may be used for imaging tissue of a subject, such as in endoscopic imaging procedures or open field surgical imaging procedures. Imaging may be performed pre-operatively, intra-operatively, post-operatively, and during diagnostic imaging sessions and procedures. The imaging methods per se may exclude insertion of an endoscopic imager into a lumen in the body or the use of an open field imaging system. The endoscopic imager may be pre-inserted into a lumen in the body. The imaging methods per se may exclude any invasive surgical step.

Disclosed herein are exemplary devices, apparatuses, systems, methods, and non-transitory storage media for generating an intraoperative fluorescence image of a subject. The system can receive an intraoperative white light image of the subject, input the intraoperative white light image of the subject into a generator of a trained GAN model trained. The GAN model has been trained using paired or unpaired training images. In some examples, the GAN model is trained using a plurality of training image pairs, and each training image pair comprises an intraoperative white light training image and an intraoperative fluorescence training image of a same tissue. The GAN model can be trained to generate an intraoperative fluorescence image based on an inputted intraoperative white light image. The system can obtain, from the generator, the generated intraoperative fluorescence image of the subject and display, on a display, the generated intraoperative fluorescence image of the subject.

Thus, instead of administering an imaging agent to the patient to obtain a fluorescence image, the system can simply generate a simulated fluorescence image from a white light image using the techniques described herein. The GAN model can improve surgical efficiency, improve patient outcomes, and result in more accurate diagnosis and treatment of diseases, such as, for example, by enhancing visualization by emphasizing anatomical structures that are difficult to discern in normal viewing of the white light image (e.g., structures that are at least partially hidden under fatty tissue or other structures). In some examples, the intraoperative white light image of the subject is captured during a surgical operation, and the system can provide a recommendation related to the surgical operation based on the generated intraoperative fluorescence image. The recommendation can be related to navigating a surgical instrument. The recommendation can be an indication of an anatomical structure to operate on or to avoid. The recommendation can be related to administration of a particular treatment. The recommendation can be related to identification of a high-risk area or a potential complication. In some examples, the recommendation is provided during the surgery such that the surgeon can alter the course of action in real time.

In some examples, the generated image can be provided (e.g., displayed) to a medical practitioner, who can review the image to identify, recommend, and/or administer a treatment to the patient pre-surgery, during surgery, or post-operatively. In some examples, the generated image can be provided to a computer-based system, which processes the image to identify, recommend, and/or administer a treatment to the patient. For example, the system can provide the generated image to a classification model to automatically identify one or more complications. Based on the identified issue, a treatment can be automatically recommended (e.g., via one or more graphical user interfaces). The treatment can also be automatically administered, for example, by a medical device (e.g., a surgical robot) based on the automatically recommended treatment.

In some examples, the system identifies an anatomical structure in the generated intraoperative fluorescence image and labels the intraoperative white light image based on the identification. For example, the system can identify an anatomical structure of interest from a fluorescence image because the anatomical structure appears more pronounced in the fluorescence image. After the anatomical structure is identified, the system can automatically label the identified anatomical structure in the corresponding white light image. The labelled white light image can be then used for downstream tasks, such as training a machine-learning model. Collecting, labeling, and storing a large volume of training images manually can require a large amount of time of skilled reviewers and can be error-prone because bias can be introduced by the reviewers. Thus, the techniques of automatically labelling images can lead to more efficient and accurate generation of image data (e.g., for training machine-learning models), thus improving functioning of a computer system.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A shows an example of an endoscopic imaging system 10, which includes a scope assembly 11 which may be utilized in endoscopic procedures. The scope assembly 11 incorporates an endoscope or scope 12 which is coupled to a camera head 16 by a coupler 13 located at the distal end of the camera head 16. Light is provided to the scope by a light source 14 via a light guide 26, such as a fiber optic cable. The camera head 16 is coupled to a camera control unit (CCU) 18 by an electrical cable 15. The CCU 18 is connected to, and communicates with, the light source 14. Operation of the camera 16 is controlled, in part, by the CCU 18. The cable 15 conveys video image and/or still image data from the camera head 16 to the CCU 18 and may convey various control signals bi-directionally between the camera head 16 and the CCU 18.

A control or switch arrangement 17 may be provided on the camera head 16 for allowing a user to manually control various functions of the system 10, which may include switching from one imaging mode to another, as discussed further below. Voice commands may be input into a microphone 25 mounted on a headset 27 worn by the practitioner and coupled to the voice-control unit 23. A hand-held control device 29, such as a tablet with a touch screen user interface or a PDA, may be coupled to the voice control unit 23 as a further control interface. In the illustrated example, a recorder 31 and a printer 33 are also coupled to the CCU 18. Additional devices, such as an image capture and archiving device, may be included in the system 10 and coupled to the CCU 18. Video image data acquired by the camera head 16 and processed by the CCU 18 is converted to images, which can be displayed on a monitor 20, recorded by recorder 31, and/or used to generate static images, hard copies of which can be produced by the printer 33.

Figure 1B:
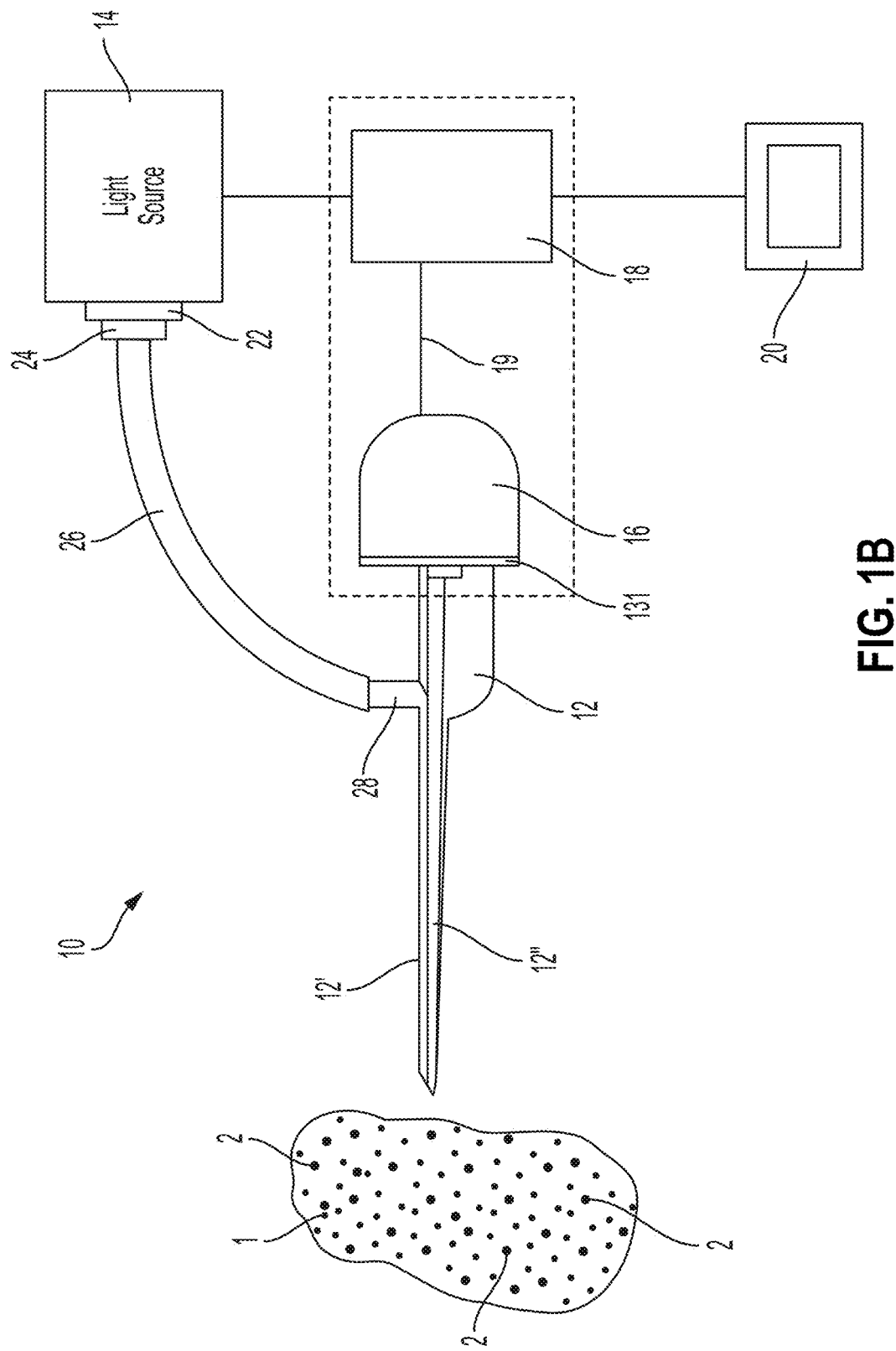
FIG. 1B is a diagram of a portion of the endoscopic camera system of FIG. 1A and a target object for imaging, according to some examples.

FIG. 1B shows an example of a portion of the endoscopic system 10 being used to illuminate and receive light from an object 1, such as a surgical site of a patient. The object 1 may include fluorescent markers 2, for example, as a result of the patient being administered a fluorescence imaging agent. The fluorescent markers 2 may comprise, for example, indocyanine green (ICG).

The light source 14 can generate visible illumination light (such as any combination of red, green, and blue light) for generating visible (e.g., white light) images of the target object 1 and can also produce fluorescence excitation illumination light for exciting the fluorescent markers 2 in the target object for generating fluorescence images. Illumination light is transmitted to and through an optic lens system 22 which focuses light onto a light pipe 24. The light pipe 24 may create a homogeneous light, which is then transmitted to the fiber optic light guide 26. The light guide 26 may include multiple optic fibers and is connected to a light post 28, which is part of the endoscope 12. The endoscope 12 includes an illumination pathway 12' and an optical channel pathway 12".

The endoscope 12 may include a notch filter 131 that allows some or all (preferably, at least 80%) of fluorescence emission light (e.g., in a wavelength range of 830 nm to 870 nm) emitted by fluorescence markers 2 in the target object 1 to pass therethrough and that allows some or all (preferably, at least 80%) of visible light (e.g., in the wavelength range of 400 nm to 700 nm), such as visible illumination light reflected by the target object 1, to pass therethrough, but that blocks substantially all of the fluorescence excitation light (e.g., infrared light having a wavelength of 808 nm) that is used to excite fluorescence emission from the fluorescent marker 2 in the target object 1. The notch filter 131 may have an optical density of OD5 or higher. In some examples, the notch filter 131 can be located in the coupler 13.

Figure 2:
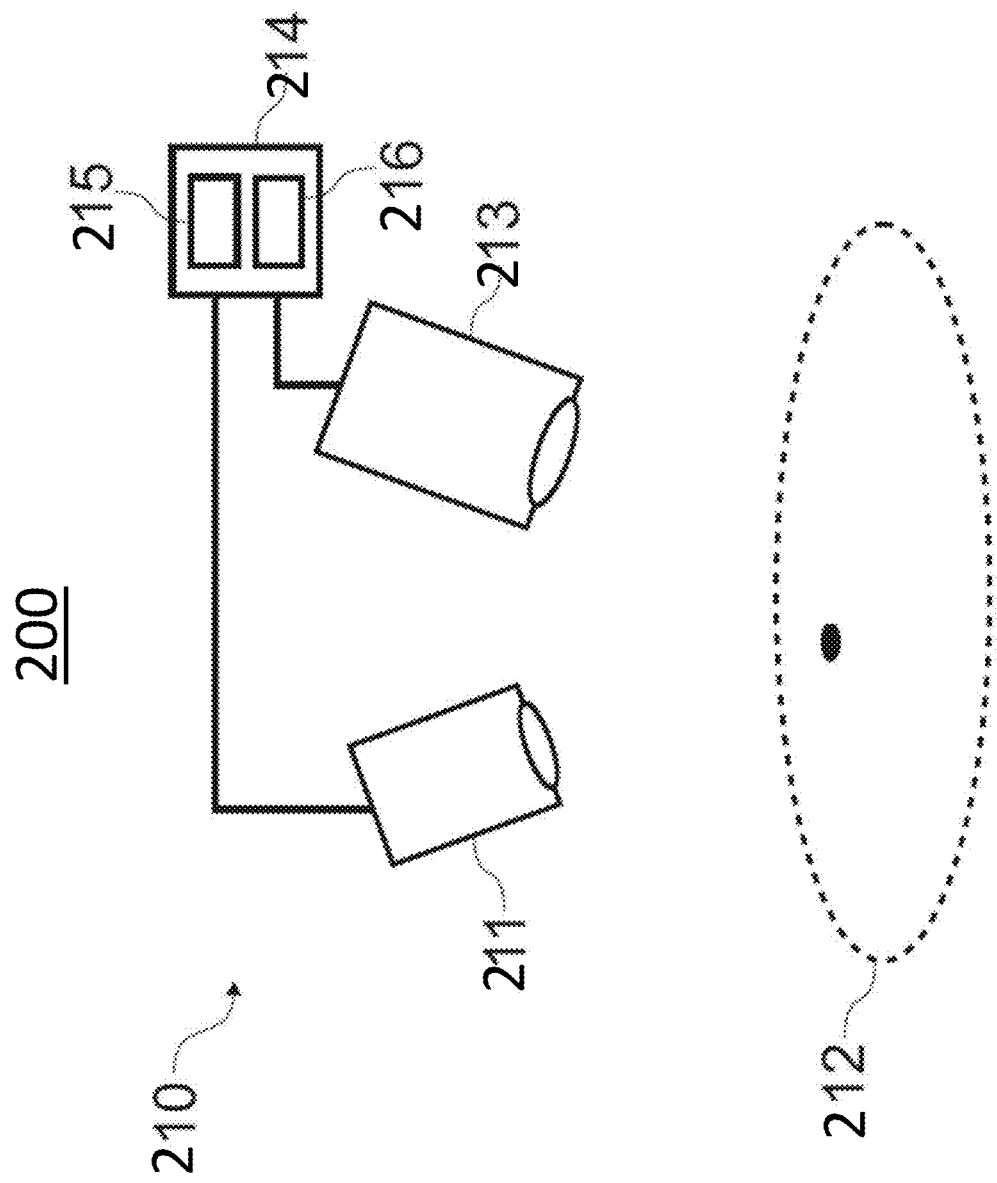
FIG. 2 illustrates a schematic view of a system for illumination and imaging according to some examples.

FIG. 2 illustrates an exemplary open field imaging system in accordance with some examples. FIG. 2 illustrates a schematic view of an illumination and imaging system 210 that can be used in open field surgical procedures. As may be seen therein, the system 210 may include an illumination module 211, an imaging module 213, and a video processor/illuminator (VPI) 214. The VPI 214 may include an illumination source 215 to provide illumination to the illumination module 211 and a processor assembly 216 to send control signals and to receive data about light detected by the imaging module 213 from a target 212 illuminated by light output by the illumination module 211. In one variation, the video processor/illuminator 214 may comprise a separately housed illumination source 215 and the processor assembly 216. In one variation, the video processor/illuminator 214 may comprise the processor assembly 216 while one or more illumination sources 215 are separately contained within the housing of the illumination module 211. The illumination source 215 may output light at different wavebands, e.g., white (RGB) light, excitation light to induce fluorescence in the target 212, a combination thereof, and so forth, depending on characteristics to be examined and the material of the target 212. Light at different wavebands may be output by the illumination source 215 simultaneously, sequentially, or both. The illumination and imaging system 210 may be used, for example, to facilitate medical (e.g., surgical) decision making e.g., during a surgical procedure. The target 212 may be a topographically complex target, e.g., a biological material including tissue, an anatomical structure, other objects with contours and shapes resulting in shadowing when illuminated, and so forth. The VPI 214 may record, process, display, and so forth, the resulting images and associated information.

Figure 3:
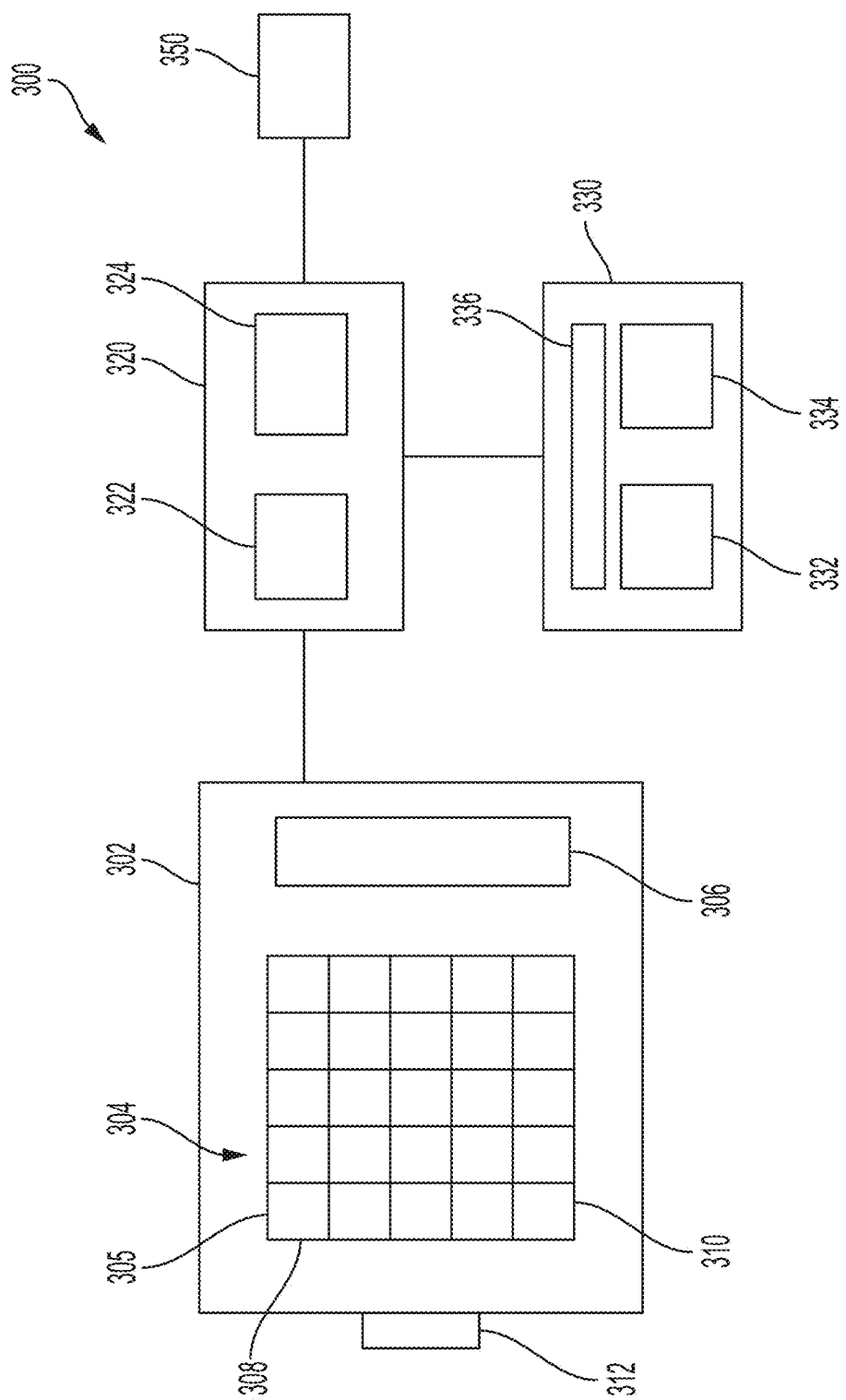
FIG. 3 is a block diagram of an imaging system, according to some examples.

FIG. 3 schematically illustrates an exemplary imaging system 300 that employs an electronic imager 302 to generate images (e.g., still and/or video) of a target object, such as a target tissue of a patient, according to some examples. The imager 302 may be a rolling shutter imager (e.g., CMOS sensors) or a global shutter imager (e.g., CCD sensors). System 300 may be used, for example, for the endoscopic imaging system 10 of FIG. 1A. The imager 302 includes a sensor, here a CMOS sensor, 304 having an array of pixels 305 arranged in rows of pixels 308 and columns of pixels 310. The imager 302 may include control components 306 that control the signals generated by the CMOS sensor 304. Examples of control components include gain circuitry for generating a multi-bit signal indicative of light incident on each pixel of the sensor 304, one or more analog-to-digital converters, one or more line drivers to act as a buffer and provide driving power for the sensor 304, row circuitry, and timing circuitry. A timing circuit may include components such as a bias circuit, a clock/timing generation circuit, and/or an oscillator. Row circuitry may enable one or more processing and/or operational tasks such as addressing rows of pixels 308, addressing columns of pixels 310, resetting charge on rows of pixels 308, enabling exposure of pixels 305, decoding signals, amplifying signals, analog-to-digital signal conversion, applying timing, read out and reset signals and other suitable processes or tasks. Imager 302 may also include a mechanical shutter 312 that may be used, for example, to control exposure of the image sensor 304 and/or to control an amount of light received at the image sensor 304.

One or more control components may be integrated into the same integrated circuit in which the sensor 304 is integrated or may be discrete components. The imager 302 may be incorporated into an imaging head, such as camera head 16 of system 10.

One or more control components 306, such as row circuitry and a timing circuit, may be electrically connected to an imaging controller 320, such as camera control unit 18 of system 10. The imaging controller 320 may include one or more processors 322 and memory 324. The imaging controller 320 receives imager row readouts and may control readout timings and other imager operations, including mechanical shutter operation. The imaging controller 320 may generate image frames, such as video frames from the row and/or column readouts from the imager 302. Generated frames may be provided to a display 350 for display to a user, such as a surgeon.

The system 300 in this example includes a light source 330 for illuminating a target scene. The light source 330 is controlled by the imaging controller 320. The imaging controller 320 may determine the type of illumination provided by the light source 330 (e.g., white light, fluorescence excitation light, or both), the intensity of the illumination provided by the light source 330, and or the on/off times of illumination in synchronization with rolling shutter operation. The light source 330 may include a first light generator 332 for generating light in a first wavelength and a second light generator 334 for generating light in a second wavelength. In some examples, the first light generator 332 is a white light generator, which may be comprised of multiple discrete light generation components (e.g., multiple LEDs of different colors), and the second light generator 334 is a fluorescence excitation light generator, such as a laser diode.

The light source 330 includes a controller 336 for controlling light output of the light generators. The controller 336 may be configured to provide pulse width modulation of the light generators for modulating intensity of light provided by the light source 330, which can be used to manage over-exposure and under-exposure. In some examples, nominal current and/or voltage of each light generator remains constant and the light intensity is modulated by switching the light generators (e.g., LEDs) on and off according to a pulse width control signal. In some examples, a PWM control signal is provided by the imaging controller 336. This control signal can be a waveform that corresponds to the desired pulse width modulated operation of light generators.

The imaging controller 320 may be configured to determine the illumination intensity required of the light source 330 and may generate a PWM signal that is communicated to the light source 330. In some examples, depending on the amount of light received at the sensor 304 and the integration times, the light source may be pulsed at different rates to alter the intensity of illumination light at the target scene. The imaging controller 320 may determine a required illumination light intensity for a subsequent frame based on an amount of light received at the sensor 304 in a current frame and/or one or more previous frames. In some examples, the imaging controller 320 is capable of controlling pixel intensities via PWM of the light source 330 (to increase/decrease the amount of light at the pixels), via operation of the mechanical shutter 312 (to increase/decrease the amount of light at the pixels), and/or via changes in gain (to increase/decrease sensitivity of the pixels to received light). In some examples, the imaging controller 320 primarily uses PWM of the illumination source for controlling pixel intensities while holding the shutter open (or at least not operating the shutter) and maintaining gain levels. The controller 320 may operate the shutter 312 and/or modify the gain in the event that the light intensity is at a maximum or minimum and further adjustment is needed.

Generating Intraoperative Imaging Data

During surgical operations, it is often valuable to provide a surgeon with fluorescence images of the relevant anatomical structures in real time. The fluorescence images can help the surgeon navigate a surgical tool, pinpoint areas to operate on, identify high-risk areas, and monitor progress of the surgery.

Figure 4B:
FIG. 4B is an exemplary white light image captured during a laparoscopic cholecystectomy, according to some examples.
Figure 4A:
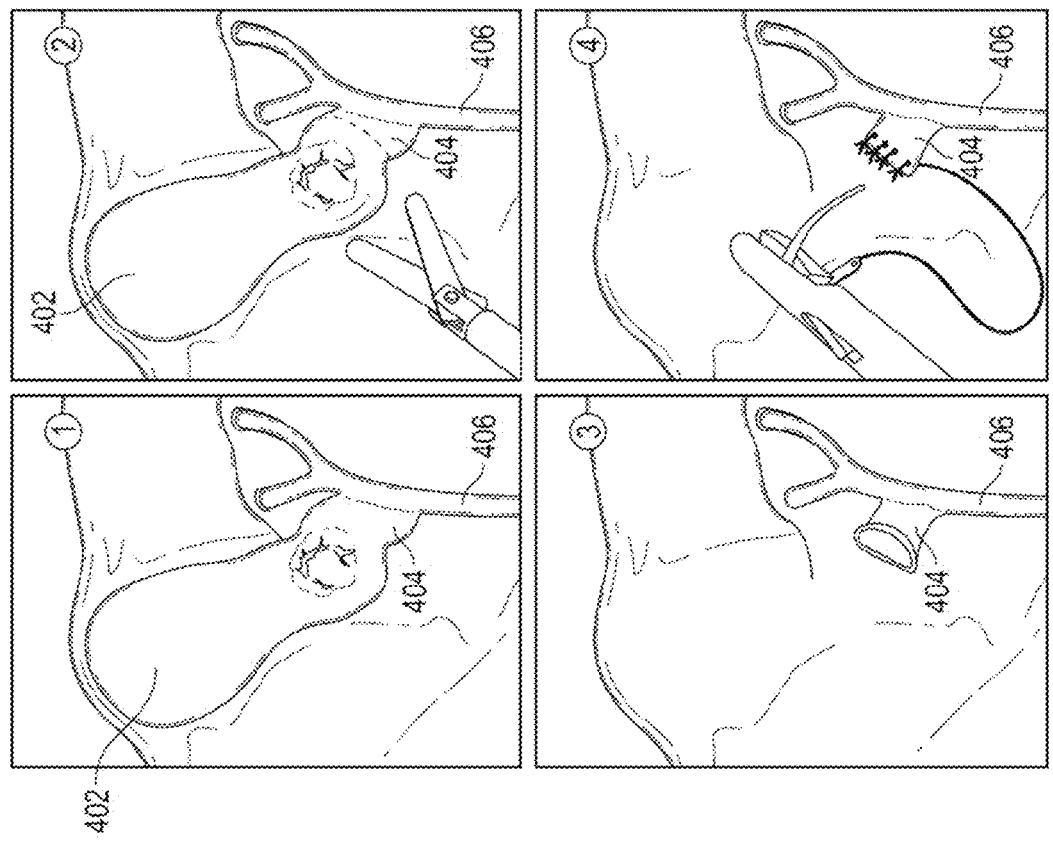
FIG. 4A illustrates an exemplary workflow of a laparoscopic cholecystectomy, according to some examples.

For example, intraoperative imaging can be useful in a laparoscopic cholecystectomy. A laparoscopic cholecystectomy involves the removal of the gallbladder using minimally invasive techniques. FIG. 4A illustrates an exemplary workflow of a laparoscopic cholecystectomy. At Step 1, the surgeon makes an incision, inserts a laparoscope, and identifies the relevant anatomical structures, such as the gallbladder 402, the cystic duct 404, and the common bile duct 406. At Step 2, the surgeon clips the cystic duct 404 and separates the gallbladder from the common bile duct. At Step 3, the gallbladder is removed. At Step 4, the cystic duct 404 is closed.

Currently, around 70% of complications in laparoscopic cholecystectomies result from injuring the common bile duct 406, for example, in Steps 2 and 3. This is because, in practice, it can be difficult for a surgeon to differentiate the relevant anatomical structures (e.g., the cystic duct 404 and the common bile duct 406) in white light images. FIG. 4B is an exemplary white light image captured during a laparoscopic cholecystectomy. As shown, the cystic duct and the common bile duct are not clearly depicted in the white light image as other tissues can obscure them and make them barely visible. Thus, the surgeon may mistakenly clip the common bile duct rather than the cystic duct, which can result in severe complications and lead to long-term disability or death.

Figure 5:
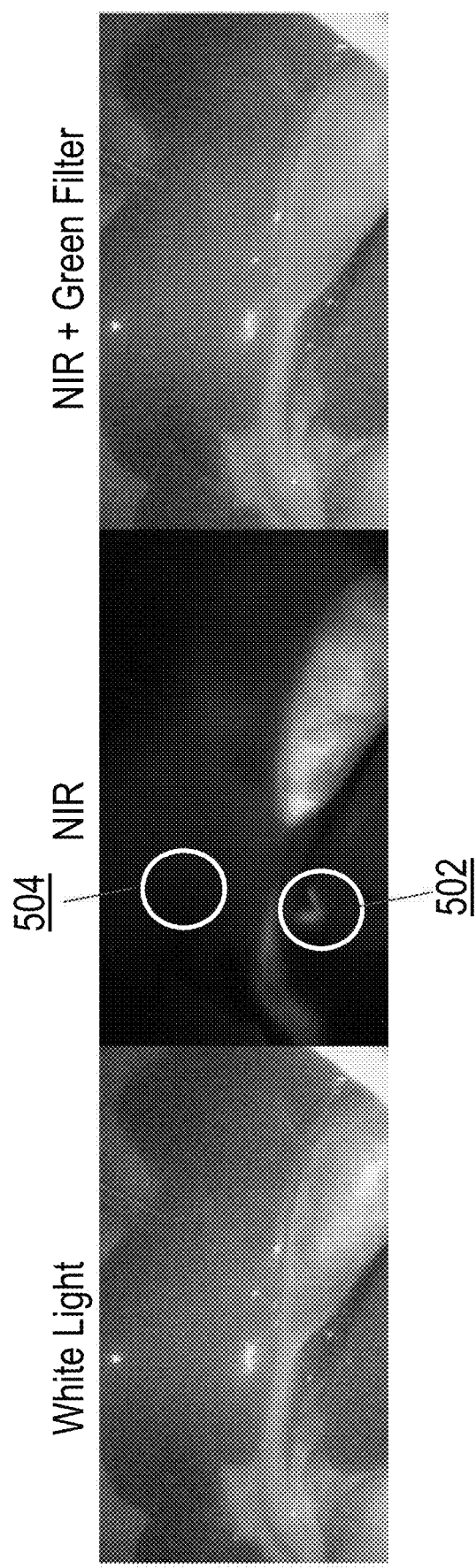
FIG. 5 illustrates a side-by-side comparison of a white light image, a near-infrared (NIR) image, and a white light image with a NIR green overlay of the same tissue, according to some examples.

To reduce complications, intraoperative imaging (e.g., fluorescence imaging) can be used to visualize important anatomical structures during the surgery. For example, inert dye indocyanine green (ICG) can be used to visualize microvascular blood flow and perfusion when seen through a near-infrared (NIR) filter, or to visualize anatomical structure once the ICG has had sufficient time to reach the anatomical structure. FIG. 5 illustrates a side-by-side comparison of a white light image, a NIR image, and a white light image with a NIR green overlay of the same tissue. In particular, the green filter is a colorized overlay of the NIR signal on the corresponding white light frame. As shown, in the NIR image and the image having the NIR green overlay, certain structures (e.g., 502) become more pronounced while certain regions (e.g., 504) become more subdued relative to the white light image. Thus, the NIR image and the image having the NIR green overlay can help the surgeon to pinpoint important anatomical structures in order to navigate the surgical tool and identify what to operate on or to avoid. In laparoscopic cholecystectomies, the probability of a complication is reduced from 1.2% to 0.01% when fluorescence imaging is used.

However, intraoperative imaging (e.g., fluorescence imaging) is often not utilized by surgeons in practice. In fact, fluorescence imaging, while useful for reasons discussed above, is only used in around 45% of surgical cases. This is because intraoperative imaging may be inconvenient or impractical. For example, for a laparoscopic cholecystectomy, ICG first needs to be absorbed by the patient's liver, which may take around 30 minutes, before it can slowly disperse through the ducts. To ensure that the ICG reaches the ducts, the ICG may need to be administered one day before the surgery. This can be expensive and inconvenient and thus is often not performed by surgeons. As an alternative, the surgeon may administer the ICG on the day of surgery and start the operation after a short period of time (e.g., 40 minutes) to avoid longer surgical time and patient exposure to anesthesia. However, with the short wait time, the majority of the ICG is concentrated in the liver rather than the ducts during the surgery, thus producing subpar fluorescence images that do not provide adequate information to the surgeon.

Figure 6:
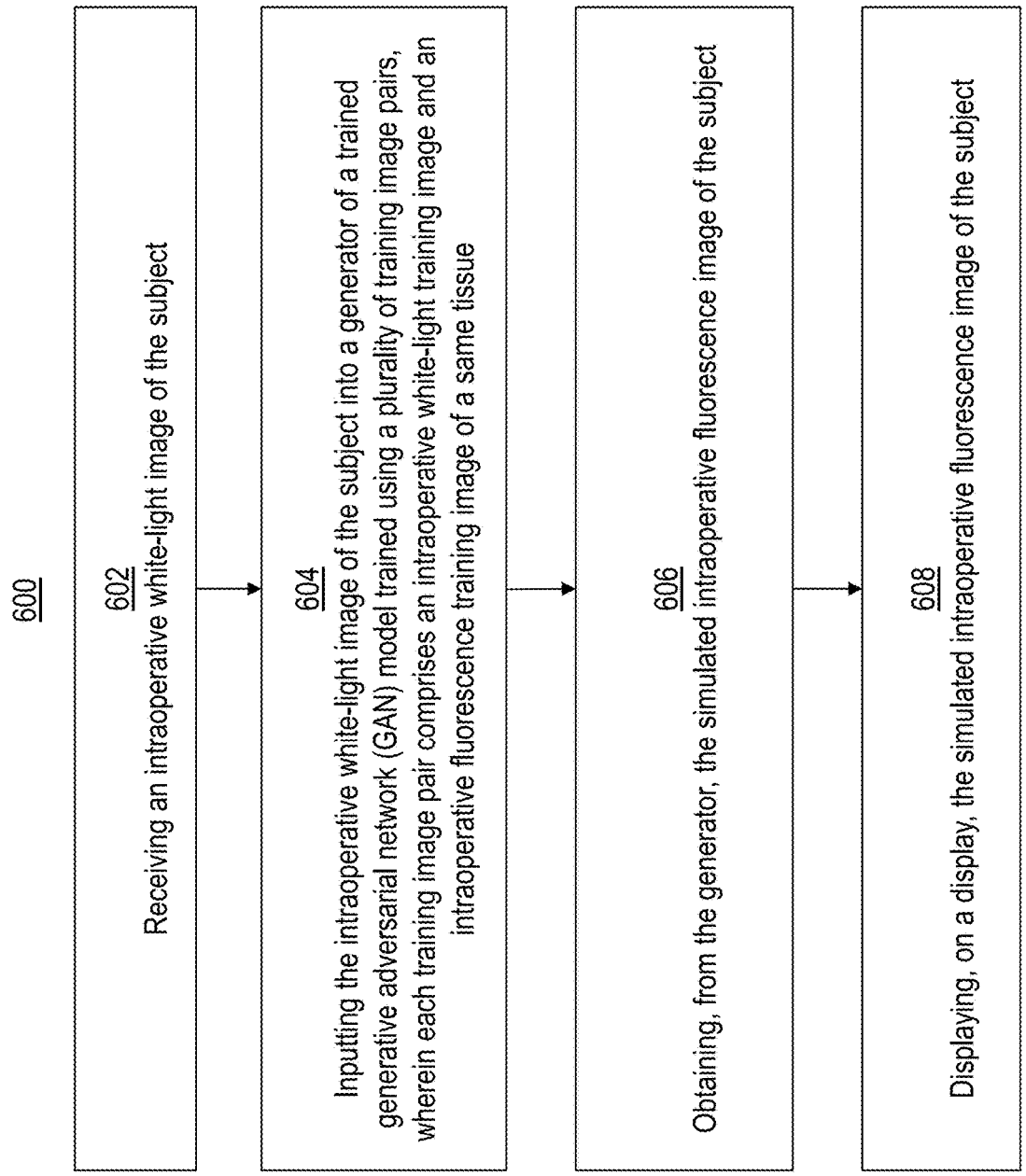
FIG. 6 illustrates an exemplary method for simulating an intraoperative fluorescence image of a subject, according to some examples.

FIG. 6 illustrates an exemplary method 600 for generating an intraoperative fluorescence image of a subject, according to some examples. Process 600 can, e.g., be performed after an endoscope has already been inserted. Process 600 is performed, for example, using one or more electronic devices implementing a software platform. In some examples, process 600 is performed using a client-server system, and the blocks of process 600 are divided up in any manner between the server and one or more client devices. In some examples, process 600 is performed using only a client device or only multiple client devices. In process 600, some blocks are, optionally, combined, the order of some blocks is, optionally, changed, and some blocks are, optionally, omitted. In some examples, additional steps may be performed in combination with the process 600. Accordingly, the operations as illustrated (and described in greater detail below) are exemplary by nature and, as such, should not be viewed as limiting.

At block 602, an exemplary system (e.g., one or more electronic devices) receives an intraoperative white light image of the subject. The white light image can be captured during an operation such as an endoscopic imaging procedure or open field surgical imaging procedure. In some examples, the intraoperative white light image depicts an anatomical structure. Examples of the anatomical structure include but are not limited to: a bile duct, a lymph node, a gallbladder, a cystic duct, a liver, a mass of adipose tissue, or a ureter. In some examples, the anatomical structure is not visible or is barely visible in the intraoperative white light image because, for example, it is covered or obscured by other tissues.

Figure 7A:
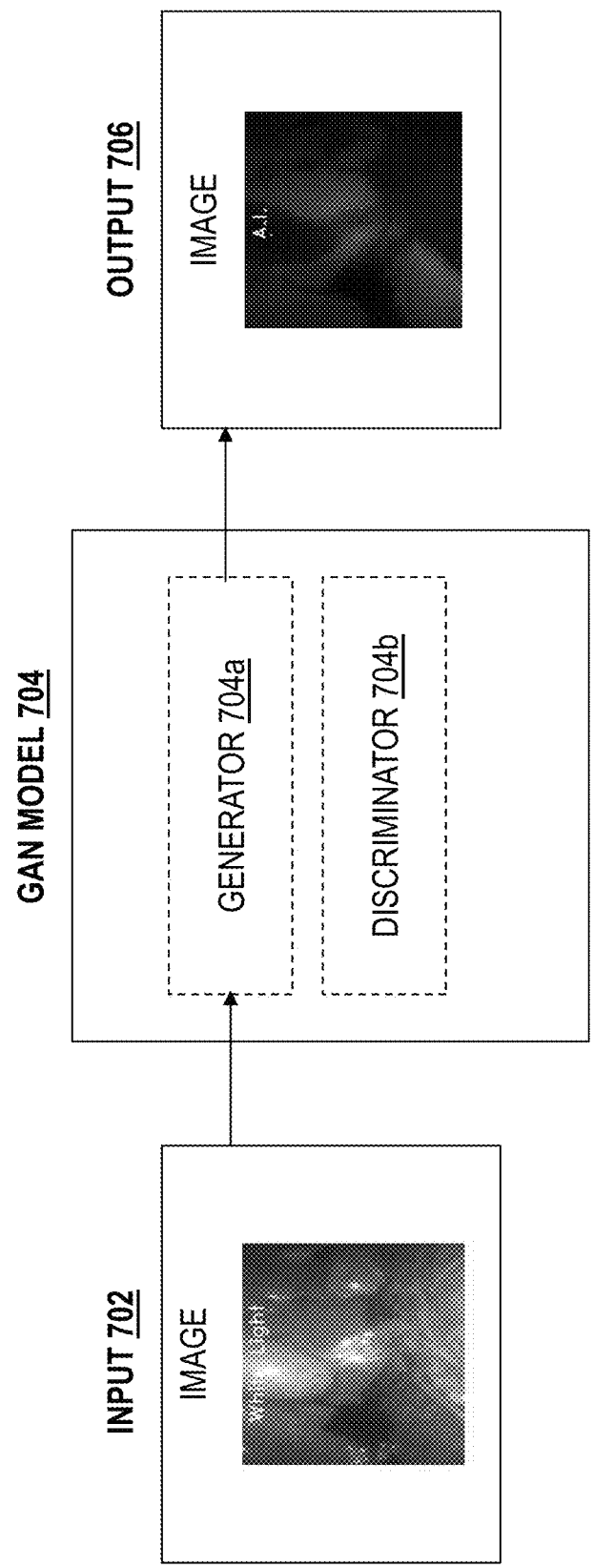
FIG. 7A illustrates an exemplary GAN model, according to some examples.

At block 604, the system inputs the intraoperative white light image of the subject into a generator of a trained GAN model. FIG. 7A illustrates an exemplary GAN model 704, in accordance with some examples. With reference to FIG. 7A, the GAN model 704 comprises a generator 704a and a discriminator 704b. An intraoperative white light image 702 is inputted into the generator 704a of the trained GAN model 704.

The GAN model (e.g., model 704) has been trained using a plurality of training images. In some examples, the training images comprise a plurality of training image pairs, and each training image pair comprises an intraoperative white light training image and an intraoperative fluorescence training image of a same tissue. In some examples, the training images are not paired. Details of training the GAN model are provided herein with reference to FIG. 7B.

Figure 8A:
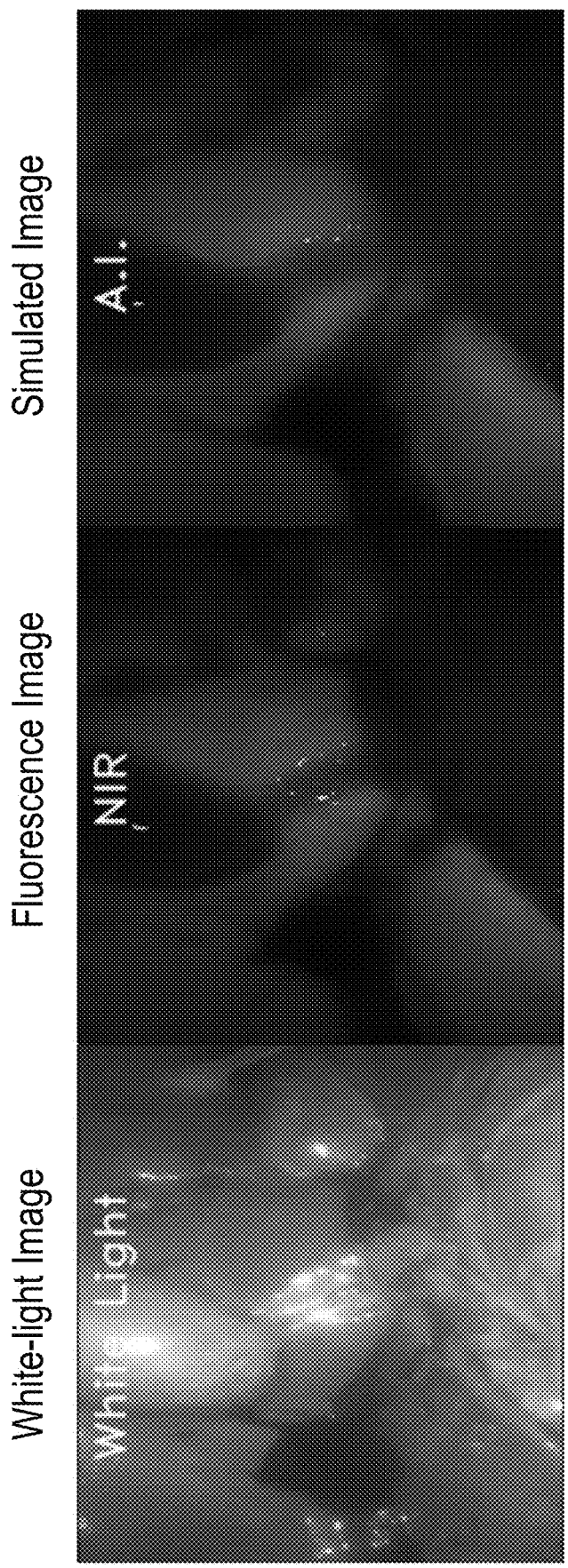
FIG. 8A illustrates an exemplary side-by-side comparison of a white light image, a fluorescence image, and a simulated image, according to some examples.

At block 606, the system obtains, from the generator, a generated, simulated, intraoperative fluorescence image of the subject. With reference to FIG. 7A, the generator 704a of the GAN model 704 outputs a generated intraoperative fluorescence image 706. FIG. 8A illustrates an exemplary side-by-side comparison of a white light image (e.g., 702 in FIG. 7A), a fluorescence image, and a simulated image generated using the techniques described herein (e.g., 706 in FIG. 7A). As shown, the generated image is visually similar to the fluorescence image and enhances the same anatomical structures. For example, the same regions of interest have more contrast in both the fluorescence image and the generated image relative to the white light image. Thus, instead of administering an imaging agent to the patient to obtain the fluorescence image, the system can simply generate the simulated fluorescence image from the white light image using the techniques described herein to guide the surgery.

At block 608, the system displays, on a display, the generated intraoperative fluorescence image of the subject. In some examples, the system simultaneously displays the generated intraoperative fluorescence image and the intraoperative white light image on the display. In some examples, the system displays the generated intraoperative fluorescence image as an overlay on the intraoperative white light image. According to some aspects, the system can enhance the simulated NIR image by applying image filters such as histogram equalization, de-noising, de-blurring, etc.

The intraoperative white light image of the subject can be captured during a surgical operation, and the system can provide a recommendation related to the surgical operation based on the simulated intraoperative fluorescence image. The recommendation can be related to navigating a surgical instrument. The recommendation can be an indication of an anatomical structure to operate on or to avoid. The recommendation can be related to administration of a particular treatment. The recommendation can be related to identification of a high-risk area or a potential complication. In some examples, the recommendation is provided during the surgery such that the surgeon can alter the course of action in real time.

The simulated image can be provided (e.g., displayed) to a medical practitioner, who can review the image to identify, recommend, and/or administer a treatment to the patient pre-surgery, during surgery, or post-operatively. Alternatively, or additionally, the generated image can be provided to a computer-based system, which processes the image to identify, recommend, and/or administer a treatment to the patient. For example, the system can provide the generated image to a classification model to automatically identify one or more complications. Based on the identified issue, a treatment can be automatically recommended (e.g., via one or more graphical user interfaces). The treatment can also be automatically administered, for example, by a medical device (e.g., a surgical robot) based on the automatically recommended treatment.

The system may identify an anatomical structure in the generated intraoperative fluorescence image and label the intraoperative white light image based on the identification. For example, the system can identify an anatomical structure of interest from a fluorescence image because the anatomical structure appears more pronounced in the fluorescence image. After the anatomical structure is identified, the system can automatically label the identified anatomical structure in the corresponding white light image. The labelled white light image can be then used for downstream tasks, such as training a machine-learning model.

FIG. 7B illustrates an exemplary process for training a GAN model. The GAN model 704 here comprises a generator 704a and a discriminator 704b. With reference to FIG. 7B, the model is trained using training images 710. In this example, the training images 710 comprise a plurality of training image pairs, and each training image pair comprises an intraoperative white light training image (e.g., 710a) and an intraoperative fluorescence training image of a same tissue (e.g., 710b). The intraoperative fluorescence image data can depict anatomical structures after an imaging agent, such as a targeted imaging agent or a general imaging agent, is applied. In some examples, the imaging agent is indocyanine green (ICG) or methylene blue. According to some examples, a suitable fluorescence imaging agent for use in fluorescence imaging applications to generate fluorescence image data is an imaging agent which can circulate with the blood (e.g., a fluorescence dye which can circulate with, for example, a component of the blood such as lipoproteins or serum plasma in the blood) and transit vasculature of the tissue (i.e., large vessels and microvasculature), and from which a signal intensity arises when the imaging agent is exposed to appropriate light energy (e.g., excitation light energy, or absorption light energy). In various examples, the fluorescence imaging agent comprises a fluorescence dye, an analogue thereof, a derivative thereof, or a combination of these. A fluorescence dye includes any non-toxic fluorescence dye. In certain examples, the fluorescence dye optimally emits fluorescence in the near-infrared spectrum. In certain examples, the fluorescence dye is or comprises a tricarbocyanine dye. In certain examples, the fluorescence dye is or comprises ICG, methylene blue, or a combination thereof. In other examples, the fluorescence dye is or comprises fluorescein isothiocyanate, rhodamine, phycoerythrin, phycocyanin, allophycocyanin, o-phthaldehyde, fluorescamine, rose Bengal, trypan blue, fluoro-gold, or a combination thereof, excitable using excitation light wavelengths appropriate to each dye. In some examples, an analogue or a derivative of the fluorescence dye may be used. For example, a fluorescence dye analog or a derivative includes a fluorescence dye that has been chemically modified, but still retains its ability to fluoresce when exposed to light energy of an appropriate wavelength.

In some examples, the intraoperative white light image data and the intraoperative fluorescence image data in the training images 710 depict anatomical structures. Examples of the anatomical structure include but are not limited to: a bile duct, a lymph node, a gallbladder, a cystic duct, a liver, a mass of adipose tissue, or a ureter. In some examples, the intraoperative white light image data and the intraoperative fluorescence image data in the training images 710 depict a cancer tumor. In some examples, the anatomical structure of interest is not visible or is barely visible in an intraoperative white light image, but is more pronounced in the corresponding intraoperative fluorescence image. Thus, the GAN network can be trained to discern and enhance weak signatures of the anatomical structure in a white light image and generate a simulated fluorescence image in which the anatomical structure is more visible.

The system may obtain the plurality of training image pairs 710 by obtaining intraoperative white light image data and intraoperative fluorescence data of the same procedure. For example, the system can obtain one or more intraoperative white light videos of a procedure and one or more intraoperative fluorescence videos of the same procedure. The system can then select one or more images from the intraoperative white light data and one or more images from the intraoperative fluorescence data to include in the plurality of training image pairs. For example, the system can select an image from the intraoperative white light video and, based on the timestamp of the selected image, select an image from the intraoperative fluorescence video that is taken at the same time. The two images can form an image pair and be included in the training data. Alternatively, or additionally, the image pairs can be collected from multiple intraoperative white light videos of multiple procedures and the corresponding intraoperative fluorescence videos. In some examples, the system first samples a set of images (e.g., randomly, at regular intervals) from the videos to reduce the dataset and then selects training images from the sampled set of images.

The system can be configured to select training images based on contrast information. For example, the system can select a predefined number of images with the highest levels of contrast from an intraoperative fluorescence video to include in the training images. As another example, the system can select all images that have contrast levels above a predefined threshold from the intraoperative fluorescence video to include in the training images. After these fluorescence images are selected, the corresponding white light images can be selected to form training image pairs.

The system can be configured to select training images based on a determination that the images do not include an artifact or a predefined level of noise. The intraoperative fluorescence image data may include images with artifacts (e.g., glare spots) and images without artifacts. In order to train the GAN model to produce generated images without artifacts, the system can include fluorescence images without artifacts in the training images 710 and exclude fluorescence images with artifacts. After these fluorescence images are selected, the corresponding white light images can be selected to form training image pairs. Accordingly, the training data can force the GAN model to learn glare-free translation from a noisy input image.

The system can be configured to select the one or more images in the intraoperative fluorescence image data based on a determination of whether the one or more images include an object. The intraoperative fluorescence image data may include images with an extraneous object (e.g., a surgical instrument) and images without the extraneous object. In order to train the GAN model to produce generated images without extraneous objects, the system can include images without the extraneous object in the training images 710 and exclude images with the extraneous object from the training images. Accordingly, the training data can force the GAN model to learn to eliminate the extraneous object when translating an input image into a simulated fluorescence image.

The system can be configured to select the one or more images in the intraoperative fluorescence image data based on an event. The event may be a key event during the surgery. For example, the event can be an insertion of a surgical instrument depicted in the video. The system can select images before, during, and/or after the key event to include in the training images. Accordingly, the system can ensure that the GAN model can produce high-quality simulated images before, during, and/or after the key event.

Figure 7C:
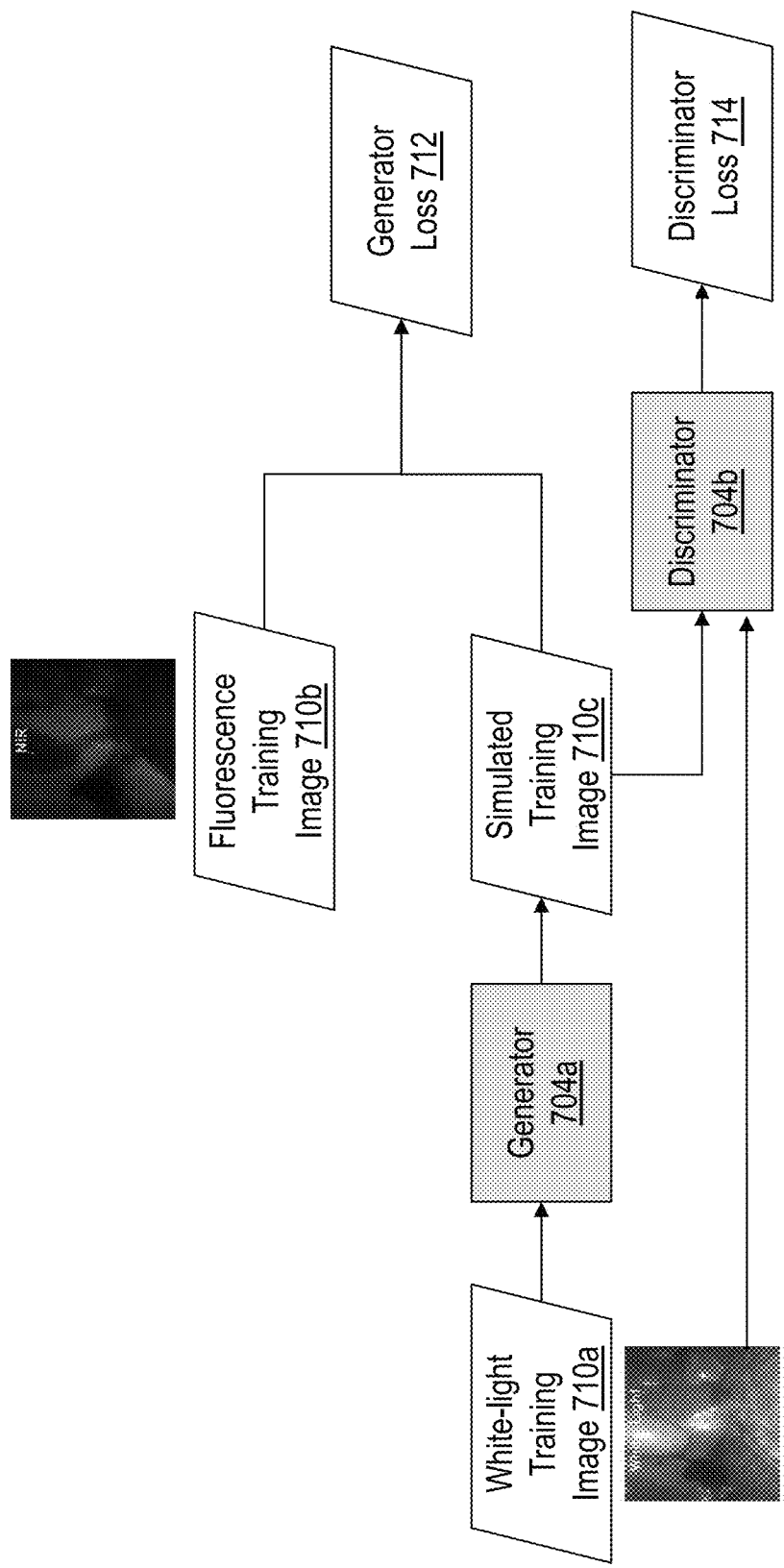
FIG. 7C illustrates an exemplary process for training a GAN model, according to some examples.

FIG. 7C illustrates an exemplary process for training a GAN model. The GAN model comprises a generator 704a configured to transform an input image into an output simulated image. The discriminator 704b is configured to receive two images, an input image and an unknown image (which can be either the fluorescence training image or the simulated fluorescence image) and determine whether the unknown image is produced by the generator. During training, each image pair of the plurality of image pairs 710 is used to train the GAN model 704a. In the depicted example, an intraoperative white light training image 710a of a particular training image pair is inputted into the generator 704a to obtain a simulated fluorescence image 710c. The simulated fluorescence image 710c is compared with an intraoperative fluorescence training image 710b of the particular training image pair to obtain a generator loss 712. Further, the white light training image 710a and the simulated fluorescence image 710c are inputted into the discriminator 704b to obtain a discriminator loss 714. The discriminator 704b is updated based on the discriminator loss 714. The generator is updated based on the discriminator loss 714 and the generator loss 712.

The generator can be a neural network. For example, the generator can be a U-Net model or a modified U-Net model. In some examples, the discriminator is a PatchGAN model. In some examples, the GAN model is a Pix2Pix model.

The GAN model can be trained using unpaired training data rather than using a plurality of training image pairs. For example, the unpaired training data can comprise a set of white light images and a set of fluorescence images, where there is no one-to-one mapping between the white light images and the fluorescence images. For example, the white light images can correspond to a first procedure and the fluorescence images can correspond to a second procedure. As another example, the white light images can correspond to a first patient and the fluorescence images can correspond to a second patient. In some examples, the GAN model trained using the unpaired training data is a CycleGAN model.

In some examples, the GAN model is trained using training data corresponding to a specific patient type, a specific procedure type, a specific anatomical structure, etc. Multiple GAN models can be trained, and the system can select a trained GAN model to process an input image based on the input image. For example, the system can train a first GAN model using training data of a first procedure and train a second GAN model using training data of a second procedure. To process an input image of the first procedure, the system can select the first GAN model and input the input image into the first GAN model to obtain a simulated fluorescence image.

FIG. 8A illustrates an exemplary side-by-side comparison of a white light image (e.g., 702 in FIG. 7A), a fluorescence image, and a generated image generated using the techniques described herein (e.g., 706 in FIG. 7A). As shown, the generated image is visually similar to the fluorescence image and enhances similar anatomical structures. For example, the same regions of interest have more contrast in both the fluorescence image and the generated image relative to the white light image. Thus, instead of administering an imaging agent to the patient to obtain the fluorescence image, the system can simply generate the simulated fluorescence image from the white light image using the techniques described herein. The generated image can be presented to the surgeon during the surgery and can be further analyzed automatically to obtain a medical recommendation, as described herein.

Figure 8B:
FIG. 8B illustrates an exemplary side-by-side comparison of a white light image, a fluorescence image, and a simulated image, according to some examples.

FIG. 8B illustrates another exemplary side-by-side comparison of a white light image (e.g., 702 in FIG. 7A), a fluorescence image, and a generated image generated using the techniques described herein (e.g., 706 in FIG. 7A). As shown, the GAN network can identify key image attributes associated with ICG intensity. As shown, the generated image shows high saturation around the relevant anatomical structures. Thus, the generated fluorescence images may be superior to actual fluorescence images in some cases.

Figure 8C:
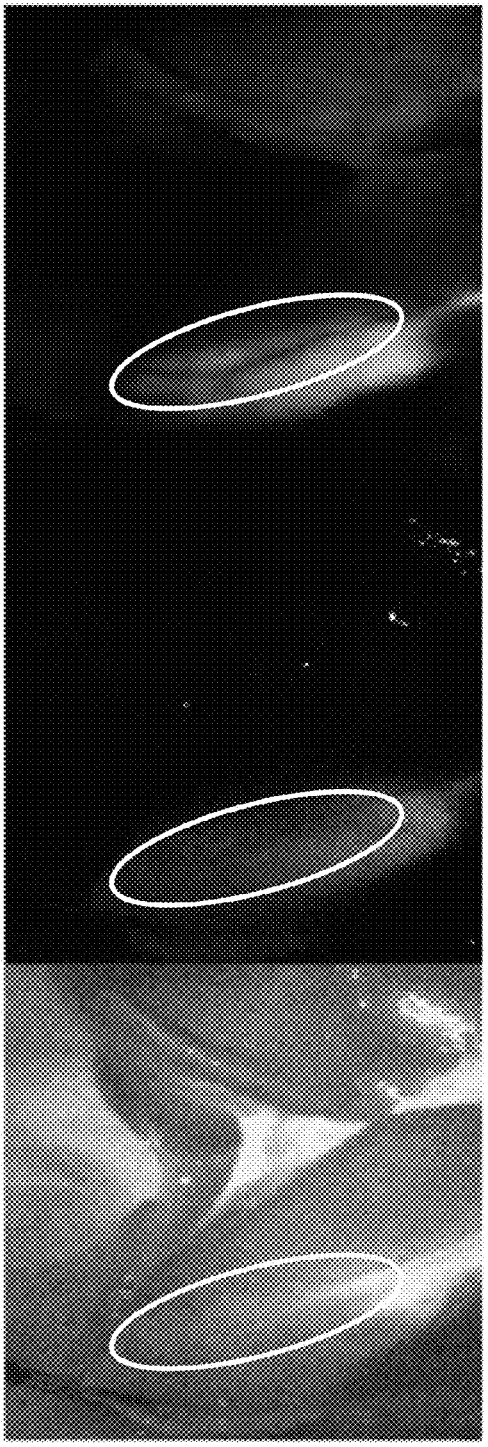
FIG. 8C illustrates an exemplary side-by-side comparison of a white light image, a fluorescence image, and a simulated image, according to some examples.

FIG. 8C illustrates another exemplary side-by-side comparison of a white light image (e.g., 702 in FIG. 7A), a fluorescence image, and a generated image generated using the techniques described herein (e.g., 706 in FIG. 7A). The generated image can depict anatomical details that are not present in the fluorescence image.

Figure 8D:
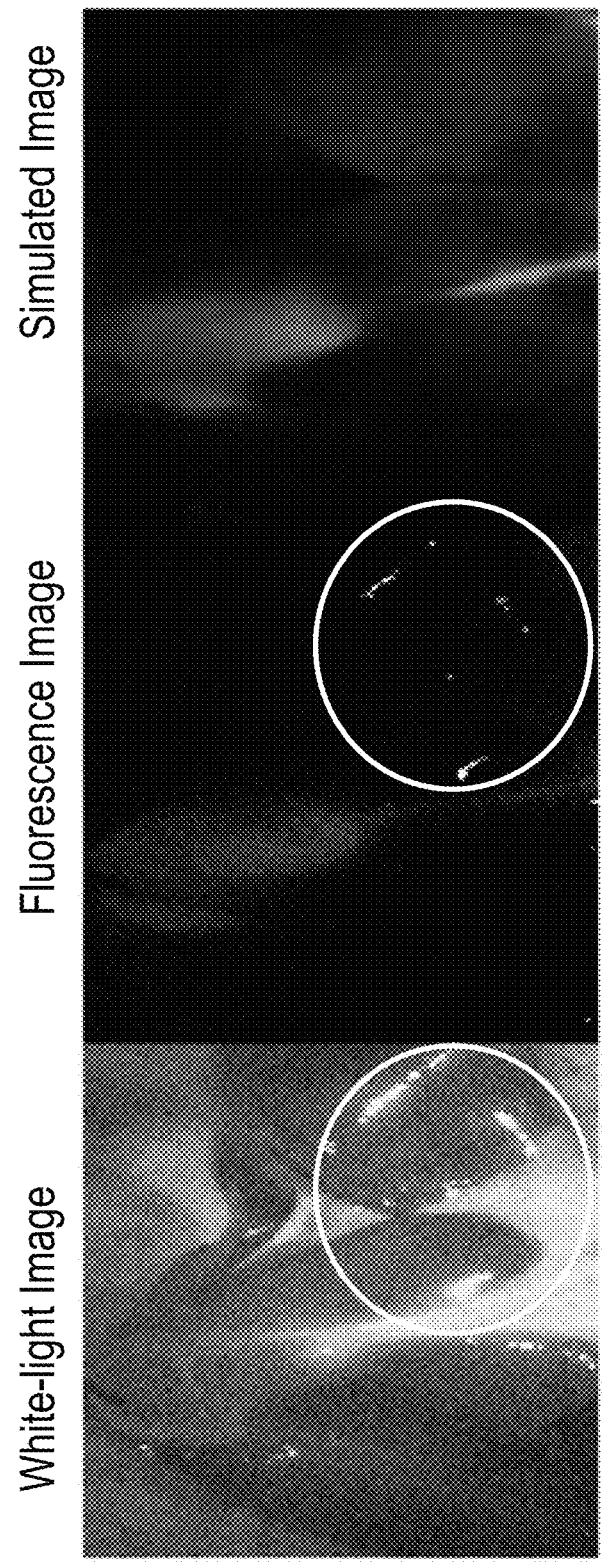
FIG. 8D illustrates an exemplary side-by-side comparison of a white light image, a fluorescence image, and a simulated image, according to some examples.

FIG. 8D illustrates another exemplary side-by-side comparison of a white light image (e.g., 702 in FIG. 7A), a fluorescence image, and a generated image generated using the techniques described herein (e.g., 706 in FIG. 7A). As shown, noise or artifacts such as glare spots that are present in the white light image and the fluorescence image is not present in the generated image. This can be achieved, for example, by training the GAN model using a training dataset in which the fluorescence training images do not include artifacts or a high level of noise, as described above. In some examples, the GAN model includes mechanisms (e.g., dark channel prior) to reduce artifacts from being generated and rendered in the generated image.

Figure 9:
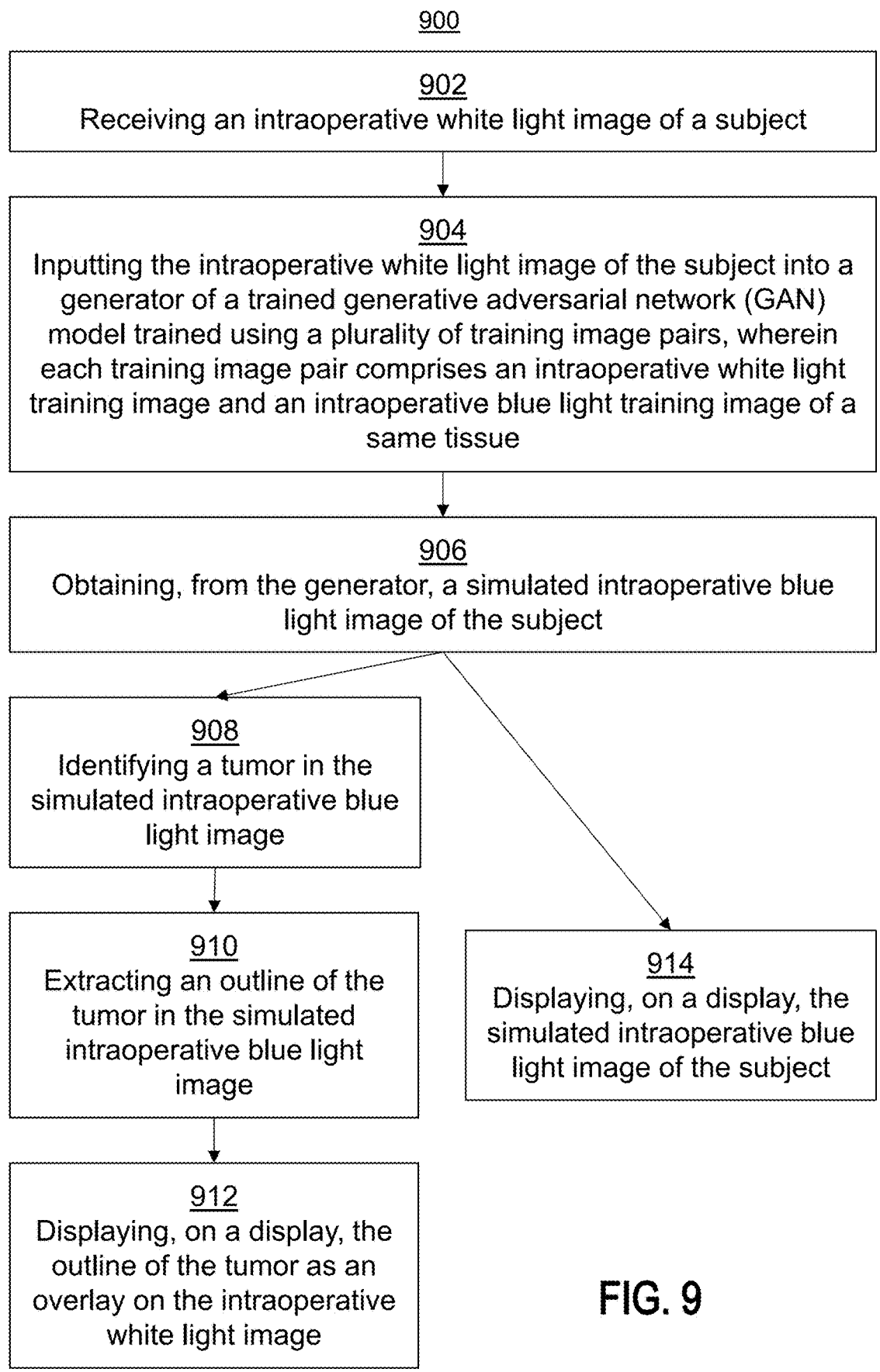
FIG. 9 illustrates an exemplary method for simulating an intraoperative blue light image of a subject.

FIG. 9 illustrates an exemplary method 900 for generating an intraoperative blue light image of a subject. FIG. 9 is an example of method 600 wherein the generated intraoperative fluorescence image is a generated intraoperative blue light image. Blue light imaging has been used to more easily visualize tumors or cancerous lesions in a bladder wall during surgery. For example, during blue light cystoscopic surgery, a blue light cystoscope can be used to visually inspect the bladder wall for tumors. This procedure involves administering an imaging agent that fluoresces in response to blue light to a patient prior to surgery, which will be absorbed by cancerous cells located in the superficial layers of the bladder, if any are present. When a blue light cystoscope is inserted into the bladder, the tumors or lesions appear in vivid pink, while the surrounding healthy tissue appear blue. The stark color differences in the blue light image help surgeons to detect, biopsy, and surgically remove only cancerous areas while preserving healthy tissue. However, blue light cystoscopic surgery has disadvantages, including requiring special equipment (dual-mode cystoscope) and a contrast agent, extending the overall procedure time (patients must wait an hour to allow for dye to absorb), and potentially leading to false positives due to delayed metabolism of healthy cells in some patients and presence of natural urine fluorophores. Method 900 can be used to generate an intraoperative blue light image that enables visualization of tumors or cancerous lesions without the disadvantages associated with blue light cystoscopic surgery.

Method 900 is performed, for example, using one or more electronic devices implementing a software platform. In some examples, method 900 is performed using a client-server system, and the blocks of method 900 are divided up in any manner between the server and one or more client devices. In some examples, method 900 is performed using only a client device or only multiple client devices. In method 900, some blocks are, optionally, combined, the order of some blocks is, optionally, changed, and some blocks are, optionally, omitted. In some examples, additional steps may be performed in combination with the method 900. Accordingly, the operations as illustrated (and described in greater detail below) are exemplary by nature and, as such, should not be viewed as limiting.

At block 902, an exemplary system (e.g., one or more electronic devices) receives an intraoperative white light image of a subject. The white light image can be captured during an operation such as an endoscopic imaging procedure or open field surgical imaging procedure. In some examples, the intraoperative white light image depicts an anatomical structure, including but not limited to the bladder. In some examples, the anatomical structure is not visible or is barely visible in the intraoperative white light image because, for example, it is covered or obscured by other tissues.

Figure 10A:
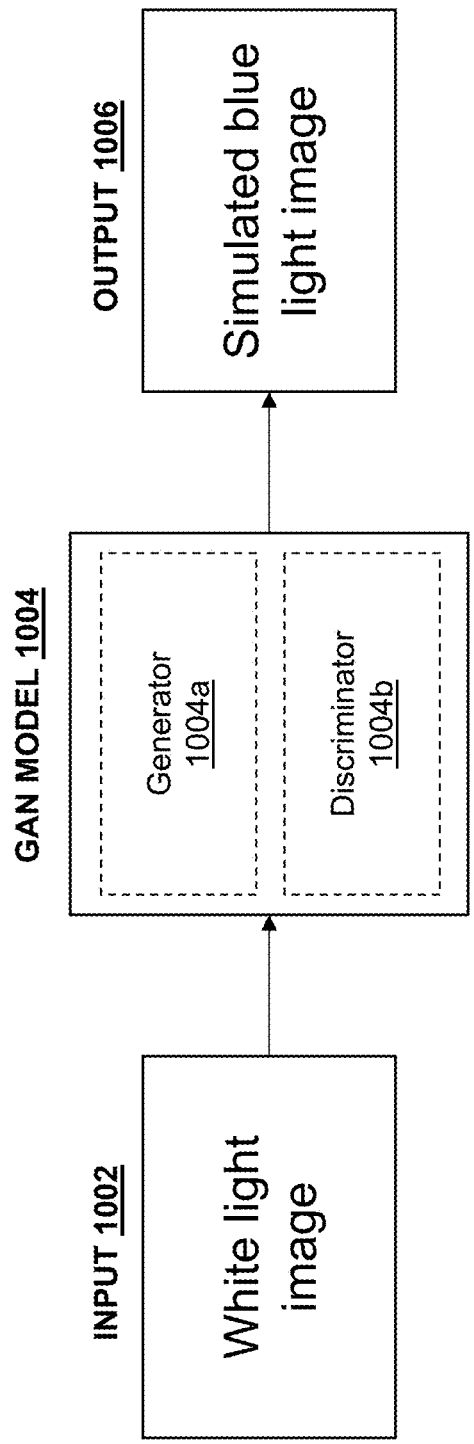
FIG. 10A illustrates an exemplary GAN model, according to some examples.

At block 904, the system inputs the intraoperative white light image of the subject into a generator of a trained GAN model. FIG. 10A illustrates an exemplary GAN model 1004 in accordance with some examples. With reference to FIG. 10A, the GAN model 1004 comprises a generator 1004a and a discriminator 1004b. An intraoperative white light image 1002 is inputted into the generator 1004a of the trained GAN model 1004.

The GAN model (e.g., model 1004) has been trained using a plurality of training images. In some examples, the training images comprise a plurality of training image pairs, and each training image pair comprises an intraoperative white light training image and an intraoperative blue light training image of a same tissue. In some examples, the training images are not paired. Details of training the GAN model are provided herein with reference to FIGS. 10B and 10C.

At block 906, the system obtains, from the generator, a generated, simulated, intraoperative blue light image of the subject. With reference to FIG. 10A, the generator 1004a of the GAN model 1004 outputs a generated intraoperative blue light image 1006. The generated intraoperative blue light image looks visually similar to a blue light image captured using a blue light imaging tool, such as a blue light cystoscope, after administering an imaging agent such as Cysview® (hexaminolevulinate hydrochloride) to the patient. For example, the color differences between healthy and cancerous tissues are more pronounced in the blue light and simulated blue light images relative to a white light image of the same tissue. Thus, instead of administering an imaging agent to the patient to obtain a blue light image, the system can simply generate the simulated blue light image from the white light image using the techniques herein.

In some examples, to improve efficiency, the generator 1004a may only output a generated intraoperative blue light image if a new white light image frame is sufficiently different from a previous white light image frame from which a blue light image has already been generated. The similarity score between the white light images can be computed using any known metrics (e.g., structural similarity index measure), and the difference threshold can be established empirically.

At block 914, the system displays, on a display, the generated intraoperative blue light image of the subject. In some examples, the system simultaneously displays the generated intraoperative blue light image and the intraoperative white light image on the display.

Alternatively or in addition to displaying the generated intraoperative blue light image or intraoperative white light image on the display, the system displays an outline of a tumor as an overlay on the intraoperative white light image. At block 908, the system identifies a tumor in the generated intraoperative blue light image. In some examples, the tumor appears pink in the generated intraoperative blue light image, while surrounding healthy tissue appears blue. In some examples, the tumor is an indication of non-muscle invasive papillary bladder cancer. At block 910, the system extracts an outline of the tumor in the generated intraoperative blue light image. At block 912, the system displays, on the display, the outline of the tumor as an overlay on the intraoperative white light image. In some examples, the area encircled by the outline is falsely colored using opaque or semi-transparent masks.

Figure 10B:
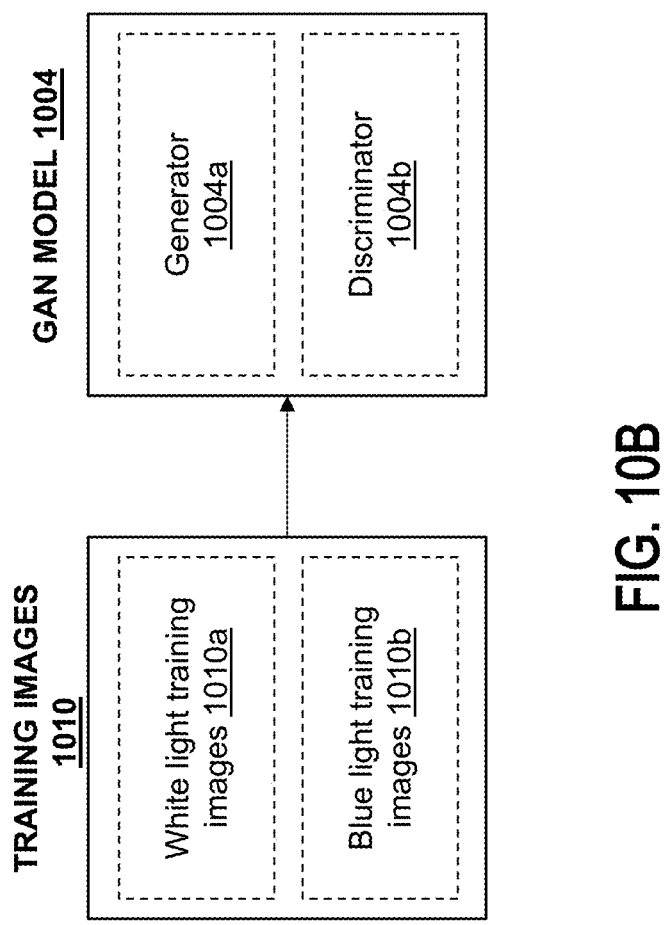
FIG. 10B illustrates an exemplary process for training a GAN model, according to some examples.

FIG. 10B illustrates an exemplary process for training a GAN model. The GAN model 1004 here comprises a generator 1004a and a discriminator 1004b. With reference to FIG. 10B, the model is trained using training images 1010. In this example, the training images 1010 comprise a plurality of training image pairs, and each training image pair comprises an intraoperative white light training image (e.g., 1010a) and an intraoperative blue light training image of a same tissue (e.g., 1010b). The intraoperative blue light image data can depict anatomical structures after an imaging agent, such as a targeted imaging agent or a general imaging agent, is applied. In some examples, the imaging agent is Cysview® (i.e., hexaminolevulinate (HAL) hydrochloride). According to some examples, prior to a cystoscopic surgery, a catheter tube is placed into the bladder through the urethra and is used to place Cysview® solution into the bladder. The solution is left in the bladder for about an hour before surgery. Cancerous cells located in the superficial layers of the bladder, if present, absorb the Cysview® solution. When a blue-light cystoscope is used to cast a blue light on the bladder wall during surgery, Cysview®-infused tumors or lesions appear in vivid pink, while the surrounding healthy tissue remains blue.

The intraoperative white light image data and the intraoperative blue light image data in the training images 1010 may depict anatomical structures, including but not limited to the bladder. The intraoperative white light image data and the intraoperative blue light image data in the training images 1010 may depict a cancer tumor. The anatomical structure of interest may not visible or may be barely visible in an intraoperative white light image, but is more pronounced in the corresponding intraoperative blue light image. Thus, the GAN network can be trained to discern and enhance weak signatures of the anatomical structure in a white light image and generate a simulated blue light image in which the anatomical structure is more visible.

The system may obtain the plurality of training image pairs 1010 by obtaining intraoperative white light image data and intraoperative blue light data of the same procedure. For example, the system can obtain one or more intraoperative white light videos of a procedure and one or more intraoperative blue light videos of the same procedure. In some examples, the procedure is performed using a dual-mode (i.e., white light mode and blue light mode) cystoscope. The system can then select one or more images from the intraoperative white light data and one or more images from the intraoperative blue light data to include in the plurality of training image pairs. For example, the system can select an image from the intraoperative white light video and, based on the timestamp of the selected image, select an image from the intraoperative blue light video that is taken at the same time. The two images can form an image pair and be included in the training data. Alternatively, or additionally, the image pairs can be collected from multiple intraoperative white light videos of multiple procedures and the corresponding intraoperative blue light videos. In some examples, the system first samples a set of images (e.g., randomly, at regular intervals) from the videos to reduce the dataset and then selects training images from the sampled set of images. In some examples, the training image pairs depict both cancerous and non-cancerous tissues.

If the set of training images 1010 depicting human patients is not sufficiently large, an animal study can be conducted to generate a plurality of training image pairs. For example, to generate a set of training images for detecting bladder cancer, a porcine study can be used. Cancer-like fluorescence can be simulated in porcine tissue by injecting Protoporphyrin IX (PPIX) into the bladder wall. Intraoperative white light image data and intraoperative blue light image data of the bladder tissue can be obtained and used to pre-train a GAN model 1004, which can subsequently be fine-tuned using human data.

Figure 10C:
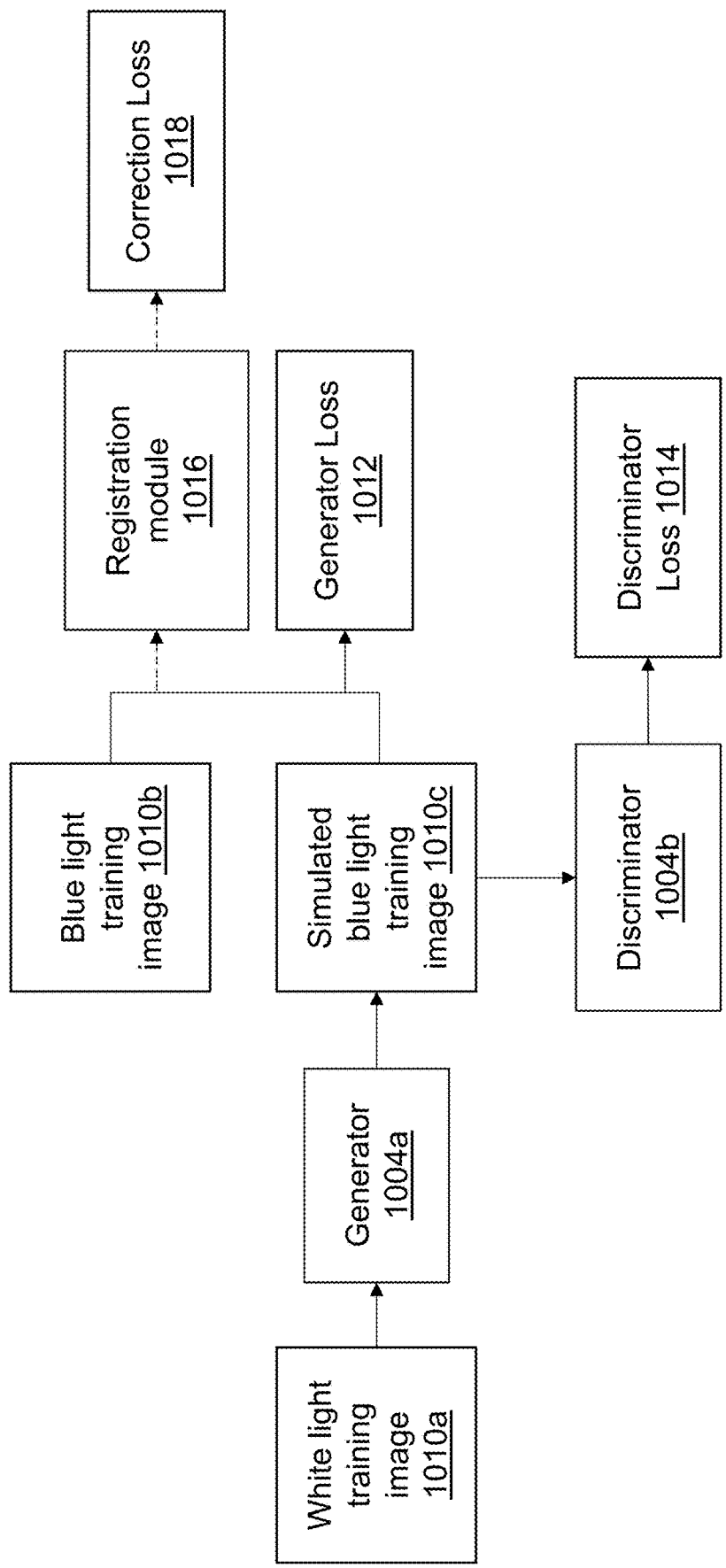
FIG. 10C illustrates an exemplary process for training a GAN model, according to some examples.

FIG. 10C illustrates an exemplary process for training a GAN model. The GAN model comprises a generator 1004a configured to transform an input image into an output simulated image. The discriminator 1004b is configured to receive two images, an input image and an unknown image (which can be either the blue light training image or the simulated blue light image) and determine whether the unknown image is produced by the generator. During training, each image pair of the plurality of image pairs 1010 is used to train the GAN model 1004a. In the depicted example, an intraoperative white light training image 1010a of a particular training image pair is inputted into the generator 1004a to obtain a simulated blue light training image 1010c. The simulated blue light image 1010c is compared with an intraoperative blue light training image 1010b of the particular training image pair to obtain a generator loss 1012. Further, the white light training image 1010a and the simulated blue light image 1010c are inputted into the discriminator 1004b to obtain a discriminator loss 1014. The discriminator 1004b is updated based on the discriminator loss 1014. The generator is updated based on the discriminator loss 1014 and the generator loss 1012.

The GAN model can be trained using unpaired training data rather than using a plurality of training image pairs. For example, the unpaired training data can comprise a set of white light images and a set of blue light images, where there is no one-to-one mapping between the white light images and the blue light images. For example, the white light images can correspond to a first procedure and the blue light images can correspond to a second procedure. As another example, the white light images can correspond to a first patient and the blue light images can correspond to a second patient. In some examples, the GAN model trained using the unpaired training data is a RegGAN model. The RegGAN model is trained using an additional registration module 1016 to calculate a correction loss 1018. Unpaired training images are considered as noisy labels, and the generator is trained with the additional registration module 1016 to fit the misaligned noise distribution adaptively. The registration module 1016 and the generator 1012 are updated with the correction loss 1018. The RegGAN model can also be trained using paired training data.

The GAN model trained using the unpaired training data can be an unsupervised cycle-consistency model such as a CycleGAN, UNIT, MUNIT, or NICEGAN model.

The GAN model trained using paired training data can be a Pix2Pix model.

Figure 11:
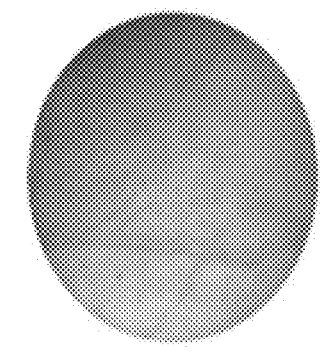
FIG. 11 illustrates an exemplary side-by-side comparison of an intraoperative white light image, a simulated intraoperative blue light image, and an intraoperative white light image overlaid with an outline of a tumor.
Figure 11:
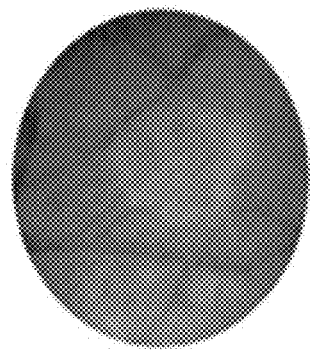
Figure 11:
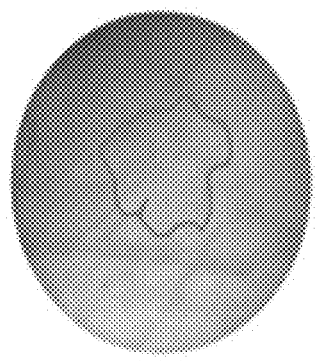

FIG. 11 illustrates an exemplary side-by-side comparison of an intraoperative white light image (e.g., 1102 in FIG. 11), a generated intraoperative blue light image generated using the techniques described herein (e.g., 1104 in FIG. 11), and an intraoperative white light image overlaid with an outline of a tumor generated using the techniques described herein (e.g., 1106 in FIG. 11). As shown, the generated blue light image can depict anatomical details that are not present in the white light image, and the contours of those anatomical details can be extracted and overlaid on the white light image. For example, the tumor is far more visible in the generated blue light image 1104 relative to the white light image 1102. Once visible in the generated blue light image, the outline of the tumor can be extracted and overlaid on the white light image 1106. Thus, instead of administering an imaging agent to the patient to obtain a blue light image, the system can simply generate a simulated blue light image from the white light image using the techniques described herein and use the blue light image to create a white light image with a tumor outline overlay. The generated blue light image and/or white light image with the outline overlay can be displayed on a display and further analyzed by a surgeon.

FIG. 12 illustrates an exemplary method 1200 for generating an intraoperative fluorescence image of a subject. Like method 900, method 1200 can be used to generate an intraoperative fluorescence image without requiring a fluorescence imaging agent or fluorescence imaging system. The generated fluorescence image can be, for example, a generated intraoperative blue light image. Method 1200 is performed, for example, using one or more electronic devices implementing a software platform. In some examples, method 1200 is performed using a client-server system, and the blocks of method 1200 are divided up in any manner between the server and one or more client devices. In some examples, method 1200 is performed using only a client device or only multiple client devices. In method 1200, some blocks are, optionally, combined, the order of some blocks is, optionally, changed, and some blocks are, optionally, omitted. In some examples, additional steps may be performed in combination with the method 900. Accordingly, the operations as illustrated (and described in greater detail below) are exemplary by nature and, as such, should not be viewed as limiting.

At block 1202, an exemplary system (e.g., one or more electronic devices) receives an intraoperative white light image of the subject. The white light image can be captured during an operation such as an endoscopic imaging procedure or open field surgical imaging procedure. In some examples, the intraoperative white light image depicts an anatomical structure, including but not limited to the bladder. In some examples, the anatomical structure is not visible or is barely visible in the intraoperative white light image because, for example, it is covered or obscured by other tissues.

At block 1204, the system generates a semantic segmentation mask outlining at least one tumor in the intraoperative white light image. The semantic segmentation mask is generated by a machine learning model trained using a plurality of training image pairs, wherein each training image pair comprises an intraoperative white light training image and an intraoperative fluorescence training image of a same tissue. The machine learning model receives a pair of training images and identifies a location of a tumor in the fluorescence training image. The location of the tumor is annotated on the corresponding white light training image. The machine learning model is updated with the annotated white light image.

At block 1206, the system extracts an outline of the tumor from the semantic segmentation mask.

At block 1208, the system generates a generated fluorescence image, wherein an area inside the outline in the generated fluorescence image is represented by a first color and an area outside the outline in the generated fluorescence image is represented by a second color. In some examples, the area inside the outline is a semi-transparent pink coloring, and the area outside the outline is a semi-transparent blue coloring, such that the generated fluorescence image mimics a blue-light image taken after administering an imaging agent to a patient.

At block 1210, the system displays a visualization of the tumor, wherein the visualization comprises a combination of the white light image received at block 1202 and the generated fluorescence image generated at block 1208.

The foregoing description, for the purpose of explanation, has been described with reference to specific examples or aspects. However, the illustrative discussions above are not intended to be exhaustive or to limit the invention to the precise forms disclosed. For the purpose of clarity and a concise description, features are described herein as part of the same or separate variations; however, it will be appreciated that the scope of the disclosure includes variations having combinations of all or some of the features described. Many modifications and variations are possible in view of the above teachings. The variations were chosen and described in order to best explain the principles of the techniques and their practical applications. Others skilled in the art are thereby enabled to best utilize the techniques and various variations with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method of imaging a subject, comprising:
   receiving an intraoperative white light image of the subject;
   inputting the intraoperative white light image of the subject into a generator of a trained generative adversarial network (GAN) model trained using a plurality of training image pairs, wherein each training image pair comprises an intraoperative white light training image and an intraoperative fluorescence training image of a same tissue, to generate an intraoperative fluorescence image based on the inputted intraoperative white light image;

obtaining, from the generator, the generated intraoperative fluorescence image of the subject; and displaying, on a display, the generated intraoperative fluorescence image of the subject.

2. The method of claim 1, further comprising: simultaneously displaying the generated intraoperative fluorescence image and the intraoperative white light image on the display.

3. The method of claim 1, further comprising: displaying the generated intraoperative fluorescence image as an overlay on the intraoperative white light image.

4. The method of claim 1, wherein the intraoperative white light image of the subject is captured during a surgical operation, the method further comprising: providing a recommendation related to the surgical operation based on the generated intraoperative fluorescence image.

5. The method of claim 4, wherein the recommendation is related to navigating a surgical instrument.

6. The method of claim 4, wherein the recommendation is related to an indication of an anatomical structure to operate on or to avoid.

7. The method of claim 1, further comprising: identifying an anatomical structure in the generated intraoperative fluorescence image; and labeling the intraoperative white light image based on the identification.

8. The method of claim 1, wherein the trained GAN model comprises a discriminator and the generator.

9. The method of claim 8, wherein the discriminator is a PatchGAN model.

10. The method of claim 8, wherein the generator is a modified U-Net model.

11. The method of claim 1, wherein the trained GAN model is a trained Pix2Pix model.

12. The method of claim 1, wherein the trained GAN model is trained by:
inputting an intraoperative white light training image of a training image pair of the plurality of training image pairs into the generator to obtain a simulated image;
comparing the simulated image with an intraoperative fluorescence training image of the training image pair to obtain a generator loss;
inputting the simulated image into a discriminator to obtain a discriminator loss;
updating the discriminator based on the discriminator loss; and
updating the generator based on the discriminator loss and the generator loss.

13. The method of claim 1, wherein the plurality of training image pairs is selected at least partially by:
obtaining intraoperative white light image data and intraoperative fluorescence data of a same procedure; and
selecting one or more images from the intraoperative white light data and one or more images from the intraoperative fluorescence data to include in the plurality of training image pairs.

14. The method of claim 13, wherein the intraoperative white light image data comprises an intraoperative white light video.

15. The method of claim 13, wherein the intraoperative fluorescence image data comprises an intraoperative fluorescence video.

16. The method of claim 15, wherein the intraoperative fluorescence image data comprises an intraoperative near-infrared ("NIR") video.

17. The method of claim 13, wherein the one or more images in the intraoperative fluorescence image data are selected based on contrast information of the one or more images.

18. The method of claim 13, wherein the one or more images in the intraoperative fluorescence image data are selected based on a determination that the one or more images do not include an artifact.

19. The method of claim 13, wherein the one or more images in the intraoperative fluorescence image data are selected based on a determination of whether the one or more images include an object.

20. The method of claim 19, wherein the object is a surgical instrument.

21. The method of claim 13, wherein the one or more images in the intraoperative fluorescence image data are selected based on an event.

22. The method of claim 21, wherein the event is an insertion of a surgical instrument.

23. The method of claim 13, wherein the intraoperative white light image data and the intraoperative fluorescence image data depict an anatomical structure.

24. The method of claim 23, wherein the anatomical structure is a bile duct, a lymph node, a gallbladder, a cystic duct, a liver, a mass of adipose tissue, or a ureter.

25. The method of claim 13, wherein the intraoperative white light image data and the intraoperative fluorescence image data depict a cancer tumor.

26. The method of claim 13, wherein the intraoperative fluorescence image data corresponds to an imaging agent.

27. The method of claim 26, wherein the imaging agent is indocyanine green (ICG) or methylene blue.

28. The method of claim 1, wherein displaying the generated intraoperative fluorescence image of the subject comprises: displaying the generated intraoperative fluorescence image after an image filter is applied.

29. The method of claim 28, wherein the image filter comprises: a histogram equalization filter, a de-noising filter, or a de-blurring filter.

30. The method of claim 1, wherein the generated intraoperative fluorescence image is a generated intraoperative blue light image and the intraoperative fluorescence training image is an intraoperative blue light training image.

31. The method of claim 30, further comprising:
identifying a tumor in the generated intraoperative blue light image;
extracting an outline of the tumor in the generated intraoperative blue light image; and
displaying the outline of the tumor as an overlay on the intraoperative white light image.

32. The method of claim 30, wherein the trained GAN model is a trained RegGAN model.

33. The method of claim 30, wherein the trained GAN model is a trained CycleGAN, UNIT, MUNIT, or NICE-GAN model.

34. A system for generating an intraoperative fluorescence image of a subject, comprising:
one or more processors;
one or more memories; and
one or more programs, wherein the one or more programs are stored in the one or more memories and configured to be executed by the one or more processors, the one or more programs including instructions for:

receiving an intraoperative white light image of the subject;

inputting the intraoperative white light image of the subject into a generator of a trained generative adversarial network (GAN) model trained using a plurality of training image pairs, wherein each training image pair comprises an intraoperative white light training image and an intraoperative fluorescence training image of a same tissue, to generate an intraoperative fluorescence image based on the inputted intraoperative white light image;

obtaining, from the generator, the generated intraoperative fluorescence image of the subject; and displaying, on a display, the generated intraoperative fluorescence image of the subject.

35. A non-transitory computer-readable storage medium storing one or more programs, the one or more programs comprising instructions, which when executed by one or more processors of an electronic device, cause the electronic device to:

receiving an intraoperative white light image of a subject;

inputting the intraoperative white light image of the subject into a generator of a trained generative adversarial network (GAN) model trained using a plurality of training image pairs, wherein each training image pair comprises an intraoperative white light training image and an intraoperative fluorescence training image of a same tissue, to generate an intraoperative fluorescence image based on the inputted intraoperative white light image;

obtaining, from the generator, the generated intraoperative fluorescence image of the subject; and displaying, on a display, the generated intraoperative fluorescence image of the subject.

* * * * *